(12) United States Patent
Bradley et al.

(10) Patent No.: US 10,019,678 B2
(45) Date of Patent: *Jul. 10, 2018

(54) EVALUATING BUSINESS COMPONENTS IN AN ENTERPRISE

(71) Applicant: INTERNATIONAL BUSINESS MACHINES CORPORATION, Armonk, NY (US)

(72) Inventors: Curtis A. Bradley, Alpharetta, GA (US); James E. Casper, Fuquay-Varina, NC (US); Teodorico J. Harrisson, Alpharetta, GA (US); Noah H. Newman, Jr., Marietta, GA (US); Jennifer D. Rae, Fleming Island, FL (US); Paul K. Tung, Dublin, CA (US)

(73) Assignee: International Business Machines Corporation, Armonk, NY (US)

( * ) Notice: Subject to any disclaimer, the term of this patent is extended or adjusted under 35 U.S.C. 154(b) by 445 days.

This patent is subject to a terminal disclaimer.

(21) Appl. No.: 13/940,808

(22) Filed: Jul. 12, 2013

(65) Prior Publication Data

US 2013/0290048 A1   Oct. 31, 2013

Related U.S. Application Data

(63) Continuation of application No. 11/029,753, filed on Jan. 4, 2005, now Pat. No. 8,489,407.

(51) Int. Cl.
| G06Q 30/02 | (2012.01) |
|---|---|
| G06Q 10/10 | (2012.01) |
| G06Q 10/06 | (2012.01) |
| G06Q 10/04 | (2012.01) |

(52) U.S. Cl.
CPC ........... *G06Q 10/063* (2013.01); *G06Q 10/04* (2013.01); *G06Q 10/06* (2013.01); *G06Q 30/0282* (2013.01)

(58) Field of Classification Search
CPC .. G06Q 30/0282; G06Q 10/063; G06Q 10/04; G06Q 10/06
USPC .................................................... 705/1.1–912
See application file for complete search history.

(56) References Cited

U.S. PATENT DOCUMENTS

| 6,633,878 | B1 | 10/2003 | Underwood |
|---|---|---|---|
| 2002/0104067 | A1 | 8/2002 | Green et al. |
| 2002/0194053 | A1 | 12/2002 | Barrett et al. |
| 2003/0033191 | A1 | 2/2003 | Davies et al. |
| 2003/0033387 | A1 | 2/2003 | Adams et al. |
| 2003/0046681 | A1 | 3/2003 | Barturen et al. |
| 2003/0192028 | A1 | 10/2003 | Gusler et al. |
| 2003/0200527 | A1 | 10/2003 | Lynn et al. |
| 2004/0015866 | A1 | 1/2004 | Estep et al. |
| 2004/0025157 | A1 | 2/2004 | Blight et al. |
| 2004/0059611 | A1 | 3/2004 | Kananghinis et al. |

(Continued)

*Primary Examiner* — Jonathan P Ouellette
(74) *Attorney, Agent, or Firm* — John R. Pivnichny; Law Office of Jim Boice

(57) ABSTRACT

A method and/or computer system evaluates an architectural fit of a business software application employed in an enterprise. A defined rating system establishes a rating of how effective a business software application is in meeting pre-determined requirements for each one of a set of business technology factors. An architectural fit analysis evaluates an architectural fit of the business software application based on inputted rating values. An analysis report is generated based on the architectural fit analysis, and a software application that provides the best architectural fit is installed.

16 Claims, 17 Drawing Sheets

(56) References Cited

U.S. PATENT DOCUMENTS

2004/0064805 A1 4/2004 Sparago et al.
2004/0088239 A1 5/2004 Eder

FIG. 4A

| IPC FORM (SERVER) | DESCRIPTION |
|---|---|
| IPC – Server List | Lists all user owned servers. |
| IPC – Deleted Server List | Lists all user owned servers to be deleted. |
| IPC – Server Summary | Captures summary characteristics and the business function delivered by the server.<br>Sub-form:<br>• IPC – Server Copy Selection<br>• Server Financials |
| IPC – Server Copy Selection | Allows data collector to create a new server entry by copying data from an already existing server. This reduces data entry time. |
| IPC – Financials | Captures server financial information. |
| IPC – Server Projects | Captures information about projects using the server and interlocked projects associated with the selected project.<br>Sub-form:<br>• Project Interlock Detail Information |
| Project Interlock Detail Information | Captures additional information about the interlocked project. |
| IPC – Environment/Services | Captures type(s) of environment(s) and service(s) available on the server. |
| IPC – Server Installation | Captures the physical location of the server, information about decommission of the server, and any unique identifiers such as serial number. |
| IPC – Server Configuration | Captures operating system and hardware characteristics of the server.<br>Sub-form:<br>• IPC – Server Network Access. |
| IPC – Server Network Access | Captures network connectivity including type of connectivity and IP addresses for the server. |
| IPC – Non - O/S Software | Captures non-operating system software installed on the server, and operations associated with supporting it and backup information.<br>Sub-form:<br>• IPC – Non OS Software Detail |
| IPC – Server Support | Captures information about companies and people who provide support for the server. |
| IPC – Support Staff Services | Captures information about the types of services individuals provide for a server. |
| IPC – Server Artifact | Captures the artifact(s) associated with the server including location and description.<br>Sub-form:<br>• IPC – Server Ancillary Information |
| IPC – Server Ancillary Information | Customized questions (not found in any other IPC form) to capture additional information about the server. These questions are created at the start of the engagement. |

FIG. 5A

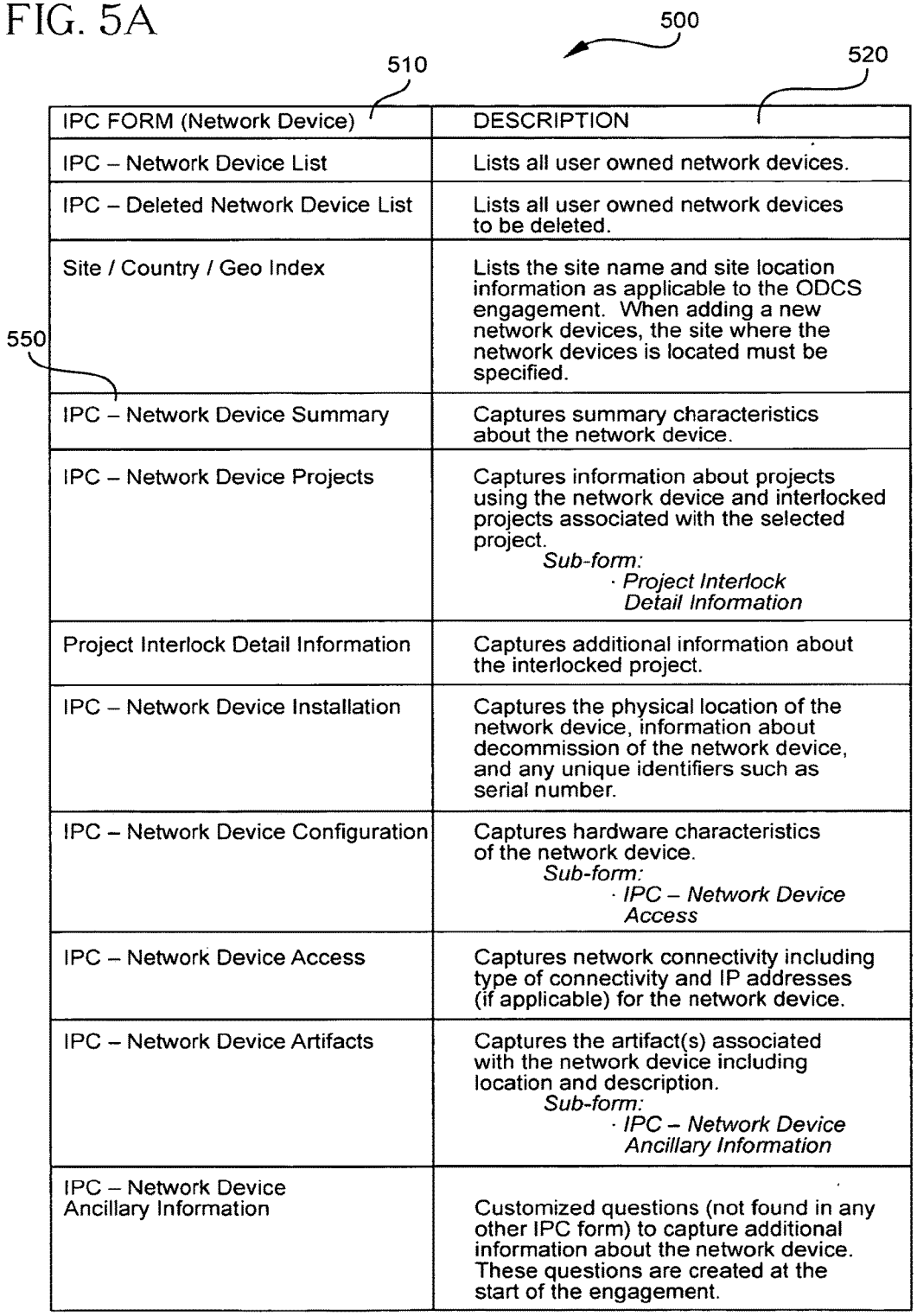

| IPC FORM (Network Device) | DESCRIPTION |
|---|---|
| IPC – Network Device List | Lists all user owned network devices. |
| IPC – Deleted Network Device List | Lists all user owned network devices to be deleted. |
| Site / Country / Geo Index | Lists the site name and site location information as applicable to the ODCS engagement. When adding a new network devices, the site where the network devices is located must be specified. |
| IPC – Network Device Summary | Captures summary characteristics about the network device. |
| IPC – Network Device Projects | Captures information about projects using the network device and interlocked projects associated with the selected project.<br>Sub-form:<br>· Project Interlock Detail Information |
| Project Interlock Detail Information | Captures additional information about the interlocked project. |
| IPC – Network Device Installation | Captures the physical location of the network device, information about decommission of the network device, and any unique identifiers such as serial number. |
| IPC – Network Device Configuration | Captures hardware characteristics of the network device.<br>Sub-form:<br>· IPC – Network Device Access |
| IPC – Network Device Access | Captures network connectivity including type of connectivity and IP addresses (if applicable) for the network device. |
| IPC – Network Device Artifacts | Captures the artifact(s) associated with the network device including location and description.<br>Sub-form:<br>· IPC – Network Device Ancillary Information |
| IPC – Network Device Ancillary Information | Customized questions (not found in any other IPC form) to capture additional information about the network device. These questions are created at the start of the engagement. |

FIG. 6A

| SPC FORM | DESCRIPTION |
| --- | --- |
| SPC – Staff / Personnel List | Lists all staff / personnel. |
| SPC – Deleted Staff / Personnel List | Lists all staff / personnel to be deleted. |
| SPC – Staff / Personnel Summary | Captures information about actual personnel or an abstraction of a person such as IT Specialist. |
| SPC – Jobs | Captures information about staff jobs and tasks. |
| SPC – Financials | Captures financial information about staff (i.e. bonuses, salary, health insurance) |
| SPC – Process & Measurement | Captures information about processes and measurements staff use. |

FIG. 6B

SPC - Summary

Last Name:
First Name:
Resource Type:

Site Name:
eMail ID
Phone No:
Account Role
Manager?
Account Role Other
Position Type
Typical Overtime Hours
Scheduled hours Per Week Delete Staff
Copy to New Staff Summary
Job(s)
Financials
Process & Measurment Infrastructure
Application
Server
Network
Staff / Personnel
Process/ Measurement
Staff/ Personnel List
I/T Portfolio Main Menu

| PMC FORM | DESCRIPTION |
|---|---|
| PMC - Business Areas Using Processes/ Measurments | To add a process/ measurment for a business area |
| PMC – Business Area Processes and Measurements List | Lists business areas for which process and measurement data has been or will be collected. |
| PMC – Process and Measurement Business Area Summary | Lists the predetermined processes and measurements for which information will be collected. The list of processes and measurements is created at the start of the engagement. Examples of processes include Backup & Recovery Management and Project Planning. Examples of measurements include Customer Satisfaction and Help Desk Responsiveness. |
| Process and Measurement – PMC Details | Captures details about the business area's process and measurement procedures and how they are implemented. |

FIG. 9A

| BUSINESS AREA FORM | DESCRIPTION |
|---|---|
| Business Area List | Lists all business areas associated with the account. |
| Deleted Business Area List | Lists all business areas associated with the account to be deleted. |
| Business Area Summary | Captures the business organizational structure. |
| Business Area Financials | Captures detailed financial and personnel information (actual and projected) with regard to the business area. |
| Business Area Ancillary | Customized questions (not found in any other ITDB form) to capture additional information about the business area. These questions are created at the start of the engagement. |

FIG. 9B

Business Area Summary

Business Area Name: [Required]
Business Area Description: [Required]
Report to Business Area: Test Company [Select One]

Business Organization Type
▲ DEL ▶
* DEL ▶
Record ▼ ▲▲▲ *

Additional Business Areas
Delete Business Areas

| Business Area Summary | Business Area Financials | Business Area Ancilliary |

Business Area List

| Application | Server | Network | Staff/Personnel | Process/Measurement | I/T Portfolio Main Menu |

950

EVALUATING BUSINESS COMPONENTS IN AN ENTERPRISE

The present application is a continuation of U.S. patent application Ser. No. 11/029,753, filed on Jan. 4, 2005, and entitled, "Method of Evaluating Business Components in an Enterprise," which is incorporated herein by reference.

BACKGROUND

The present invention relates to a method of evaluating business software application function, fit, criticality and technology compliance in an enterprise.

Organizations use a variety of business software applications, servers and network devices in their businesses. The process of performing architectural fit evaluations within an organization, determining business fit or determining business criticality, searching for the best fit servers for an application, etc. requires repeated manual perusal and research of available information. This manual process, besides being time consuming, has several drawbacks. For instance, to conduct a best-fit search to identify all potential servers, the organization has to rely on the knowledge of the person performing the architectural fit evaluation to identify all potential servers within the enterprise. However, there is a possibility that the person performing the evaluation may miss a better server if the person is unaware of the server within an enterprise. Moreover, the process relies on manual evaluation or interpretation of system software, which could lead to both false matches and missed matches. Also, determining business fit or business criticality requires subjective evaluations, which could lead to the evaluations not being uniform throughout the enterprise. Thus, a solution is required that would enable architectural fit evaluations to be carried out in a consistent manner within an organization or enterprise.

SUMMARY

In a first aspect of the invention, there is provided a method of evaluating an architectural fit of a plurality of business software applications employed in an enterprise. The method comprises providing a computer tool with a defined rating system for each one of a set of business technology factors and with a set of defined keys having respective key values. The method further comprises inputting into the computer tool data for a plurality of business components using the respective key values, ranking one or more of the set of business technology factors according to the defined rating system in the computer tool, and conducting an analysis to evaluate the architectural fit of the plurality of business software applications based on the data inputted using the respective key values and the ranked set of business technology factors. The conducting step further comprises providing at least one business or technology objective and executing an algorithm corresponding to the one business or technology objective provided to conduct the analysis.

In another embodiment of the invention, there is provided a method of analyzing one or more of a plurality of business components employed in an enterprise. The method comprises identifying at least one business or technology objective pertaining to the plurality of business components, providing a computer tool with a defined rating system for each one of a set of business technology factors and with a set of defined keys having respective key values. The method further comprises entering into the computer tool data pertaining to the plurality of business components using the respective key values, ranking one or more of the set of business technology factors according to the defined rating system in the computer tool, and running an analysis report to analyze one or more of the plurality of business components based on at least one identified business or technology objective, the data entered using the respective key values and the ranked set of business technology factors. The entering step further comprises entering data into one or more forms of the computer tool for each of the plurality of business components. Further, the running step comprises providing algorithms for each one of a plurality of business and technology objectives and selecting an appropriate one of the algorithms corresponding to the one business or technology objective identified to run the analysis report.

In yet another embodiment of the invention, there is provided a programmable media containing programmable software to evaluate architectural fit of a plurality of business software applications in an enterprise. The programmable software comprises accessing a defined key table for a plurality of business components and a rating table for each one of a set of business technology factors, and inputting data for the plurality of business components in a memory using respective key values from the defined key table. The programmable software further comprises ranking one or more of the set of business technology factors using respective rating values from the rating table and executing an analysis to evaluate architectural fit of the plurality of business software applications based on data inputted using the respective key values and the ranked set of business technology factors. The step of accessing further includes providing an instance of a database tool with a defined rating system for each one of the set of business technology factors and with a set of defined keys having respective key values. Further, the executing step includes providing at least one business or technology objective and accessing an algorithm corresponding to the one business or technology objective provided to execute the analysis.

The data for the plurality of business components comprises an application component and a server component, and also preferably comprises one or more of the following: network device component, staff and personnel component, process and measurements component, and more preferably comprises an account artifact section and a business areas section. The set of business technology factors comprises at least one of: business function, business fit, business criticality and software enterprise. The defined rating system for the set of business technology factors includes a set of rating labels and a corresponding set of rating values. In a one embodiment the set of defined keys includes an application key for each of the business software applications employed in the enterprise, a server key for each of the servers employed in the enterprise, and more preferably, also includes a network device key for each of the network devices employed in the enterprise, a staff/personnel key for each employee employed within the enterprise, and a process/measurement key for each process employed within the enterprise. Preferably, the application key for each of the business software applications includes at least one of, preferably each of the following: vendor, product and release number. Further, in a one embodiment, each of the respective key values is a unique numeric value that is randomly generated.

In one embodiment, a method evaluates an architectural fit of a business software application employed in an enterprise. The method provides a computer tool with a defined rating system for the business software application, wherein the defined rating system provides a system for rating how effective the business software application is in meeting pre-determined requirements for each one of a set of business technology factors, wherein the set of business technology factors comprises: a business function factor, wherein the business function factor is defined as a measure of how successful the business software application is in meeting user-defined needs of operations within an enterprise, a business fit factor, wherein the business fit factor is defined as a measure of how successful the business software application is in meeting stated goals of the enterprise, a business criticality factor, wherein the business criticality factor is defined as a measure of how critical the operations within the enterprise are to meeting the stated goals of the enterprise, and a software enterprise factor, wherein the software enterprise factor is defined as a measure of how compatible the business software application is with existing servers in the enterprise. Rating values for the business software application are input into the computer tool, wherein the rating values describe how effective the business software application is in meeting the pre-determined requirements of each one of the set of business technology factors. A processor executes computer code for conducting an architectural fit analysis to evaluate said architectural fit of said business software application based on inputted said rating values, wherein the analysis is performed by the processor utilizing inputted said rating values for the business software application and other software applications for comparing the business software application with the other software applications, wherein said comparing determines which software application provides a best architectural fit based on inputted rating values for the business software application and the other software applications. An analysis report is generated based on the analysis, wherein the analysis report describes which software application provides the best architectural fit for meeting the pre-determined requirements for all of the set of business technology factors. Based on the analysis report, one or more processors replaces a current existing software application with a different software application that meets an objective specified by a client, wherein the different software application is selected and installed to provide the best architectural fit for meeting the pre-determined requirements for all of the set of business technology factors.

BRIEF DESCRIPTION OF THE SEVERAL VIEWS OF THE DRAWINGS

The accompanying drawings which are incorporated in and form a part of this specification, illustrate embodiments of the invention and, together with the description, serve to explain the principles of the invention.

FIG. 4A is a table listing the various forms as well as descriptions of the data inputted into a server component of an Infrastructure Profiling Component (IPC) of a computer tool, in accordance with an embodiment of the invention.

FIG. 5A is a table listing the various forms as well as descriptions of the data inputted into a network device component of an Infrastructure Profiling Component (IPC) of a computer tool, in accordance with an embodiment of the invention.

FIG. 6A is a table listing the various forms as well as descriptions of the data inputted into a Staff and Personnel Component (SPC) of a computer tool, in accordance with an embodiment of the invention.

FIG. 6B shows an example of a Staff/Personnel Summary form of a Staff/Personnel Component of a computer tool, in accordance with an embodiment of the invention.

FIG. 7A is a table listing the various forms as well as descriptions of the data inputted into a Process and Measurements Component (PMC) of a computer tool, in accordance with an embodiment of the invention.

FIG. 9A is a table listing the various forms as well as descriptions of the data inputted into a Business Area section of a computer tool, in accordance with an embodiment of the invention.

FIG. 9B shows an example of a Business Area Summary form of a Business Area section of a computer tool, in accordance with an embodiment of the invention.

DETAILED DESCRIPTION

Figure 1:
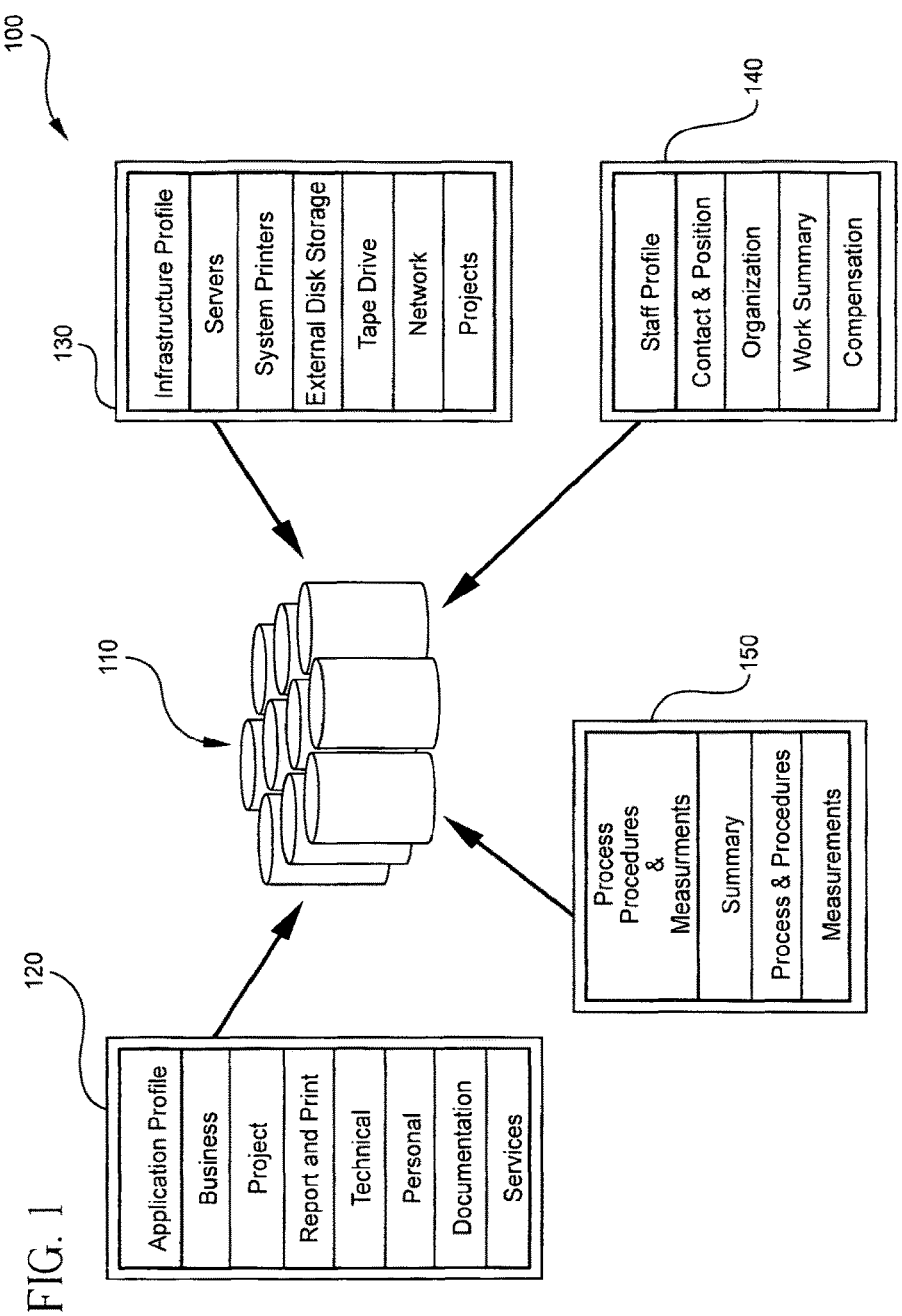
FIG. 1 is a flowchart illustrating the relationship between an integrated client database and the various business components of a computer tool, in accordance with an embodiment of the invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to embodiments of the invention.

In one embodiment, the invention provides a method of evaluating or assessing architectural fit of a plurality of business software applications used in an enterprise. In particular, the invention provides a computer tool that can be used by a business professional or a team of professionals to collect or catalog relevant Information Technology (IT or I/T) portfolio data pertaining to each of the plurality of business software applications, in a consistent fashion. As used herein, the term "business software application" or "application" refers to software applications and software application modules, including server software applications and server software application modules used by an organization or client that delivers an identifiable business function. Typically, a business software application or software application includes one or more different software application modules that are needed or used to make a business software application work for a particular organization or client. The tool is used to collect or catalog relevant data pertaining to each of these individual business software application modules as well as the overall business software application itself, preferably, non-operating system (non-OS) software application and software application modules, including non-OS server software applications and non-OS server software application modules. For example, one type of business software application is the SAP® software suite, manufactured by SAP Aktiengesellschaft Joint Stock Company. The SAP® business software application used by a client may utilize several non-OS software application modules, such as, Financial Accounting, Human Resources, Materials Management and/or Plant Maintenance. The tool is used to collect/catalog information pertaining to each of these software application modules being used by the client, namely, Financial Accounting, Human Resources, etc. as well as the SAP® software itself. In other words, the tool is used to collect information both at the software application level and the software application module level. Another example of a business software application is Financial Accounting, which application can include software application modules, such as, Accounts Receivable, Accounts Payable and/or General Ledger. Thus, if a client is using the Financial Accounting application and the various software application modules, then the tool is used to collect/catalog information pertaining to the Financial Accounting software application as well as each of the software application modules, namely, Accounts Receivable, Accounts Payable, etc.

Further, as used herein, the term "plurality of business components", which make up the Information Technology portfolio includes "business technology components" and "business information components". Preferably, the business technology components include an Application Profiling or Profile Component (APC) (or referred to as an Application Component), and a Server profiling component (or referred to as a Server Component), whereas, the business information components include a Network Device Profiling Component (or referred to as a Network Device Component), Staff and Personnel Component (SPC), a Process and Measurements Component (PMC), an Account Artifacts section and a Business Areas section. In one embodiment, the APC contains information pertaining to any, and preferably, all business software applications and/or business software application modules used within the enterprise. The Server Component and the Network Device Component, collectively, are referred to as the Infrastructure Profiling Component (IPC), which contains information pertaining to any, and preferably, all computer servers and network devices used within the enterprise, respectively. The SPC contains information pertaining to staff and personnel employed within the enterprise. Similarly, the PMC contains information pertaining to any, preferably, all processes and measurements used within the enterprise, the Accounts Artifacts section contains miscellaneous information, such as, service agreements with other companies, site plans, architectural diagrams, etc., whereas, the Business Areas section captures information, such as, the business organizational structure (organizational chart), financial and personnel information. Further, preferably, one or more of the business components also include a Financial Profiling Component (or referred to as a Financial Component), so that a financial profile is included within these one or more business components. In one embodiment, the Financial Profiling Component is included within the Server component and the Staff and Personnel Component and, in one embodiment includes data pertaining to one or more of the following categories: support contracts, lease agreements, personnel costs and organizational costs. Further, the Reports section provides standard reports for data captured within the ITDB. The use of the term "Profile Component" or "Profiling Component" simply refers to the fact that the tool profiles information into various components.

Further, as used herein, the term "architectural fit" (also referred to as Architectural Compliance or Technology Compliance) refers to the complete Information Technology (IT or I/T) environment or portfolio of an organization and how the different business components within the I/T portfolio work together to meet the business needs of an organization. Moreover, with respect to applications, the term "architectural fit" conveys a measure of an existing or current information technology environment, such as, an existing non-operating system software application being used, against a target environment to be achieved, that is, switching to using a different non-operating system software application that meets an objective specified by a client. In particular, when a client defines the technology it wishes to have in its enterprise (that is, the client sets forth a business and/or technology objective for creating a target environment, such as, only utilizing applications in the enterprise that meet a certain criteria), an associated rating system is developed for each non-operating system piece of software application (such as, a database software, a communications software, etc.), such that each business software application can be evaluated for its fit/compliance with the architectural standards specified by the client.

In one embodiment, the computer tool is a commercially available database program, preferably, the Microsoft (MS) Access® database program used for collecting data pertaining to an organization's Information Technology (I/T) portfolio. The database tool, referred to as an "Information Technology Portfolio Database (ITDB) tool", is made up of a series of forms, where each of the forms is used to input or collect or catalog data or information relating to one or more of the plurality of business components. The forms for each of the business components are connected and integrated, so that the data or information inputted into the various forms may be used to perform a variety of business evaluations. Furthermore, the integrated ITDB tool utilizes a commercially available database program, preferably, the MS Access® database software (preferably, a 2000 or later version), plus, utilizes an installed relational database management system for a client server environment, preferably, the DB2® computer program that is commercially available from International Business Machines Corporation (IBM). Preferably, standard tables are created first using IBM's DB2® relational database, so that the information or data can be stored as a collection of tables that are logically linked together. For example, there are tables for software enterprise rating, business fit rating, business criticality rating, etc.

In one embodiment, the method of evaluating architectural fit of business software applications comprises providing a computer tool (the ITDB tool) that has a set of defined keys with respective key values for each of a plurality of business components used in an enterprise. Further, the computer tool has a defined rating system for each one of a set of business technology factors pertaining to the enterprise. The method further comprises inputting into the computer tool data pertaining to the plurality of business components using the respective key values. Furthermore, the method comprises ranking using the defined rating system in the computer tool, one or more of the set of business technology factors. Finally, the method comprises conducting an analysis to evaluate the architectural fit of the plurality of business software applications based on the inputted data using the respective key values and the ranked set of business technology factors. Preferably, the conducting step includes providing at least one business or technology objective, and executing an algorithm corresponding to the business or technology objective provided to conduct the architectural fit analysis. In one embodiment, a set of algorithms or scripts are provided in the tool, whereby, one selects an appropriate algorithm or script corresponding to the identified objective. Moreover, the analysis results can be displayed in various formats, such as graphs or tables that are either stored or printed out.

In one embodiment, a defined key is created for each of the plurality of business software applications and comprises at least one of, more preferably, all of the following: vendor, product and release number. Further, each of the respective key values corresponding to the set of defined keys is a unique numeric value that is randomly generated. In particular, when defining a software application in the tool for the first time, an ITDB (Information Technology Portfolio Database) professional or an ITDB team enters at least one of, or more preferably, all of the following information associated with that particular software application, namely, vendor, product and release number. It is this specific type of combination, such as, that of vendor, product and release number that is referred to as a "defined key". Each defined key gets assigned a respective key value, which is a unique numeric value that is preferably randomly generated. In one embodiment, the tool includes a unique key value generator, such as, a computer system, that generates a unique key value which is used only once and is used to identify only one particular product, so that each key value is a unique numeric value that has not been previously used to identify another product. For instance, each key value represents one product having one defined key, for instance, the same vendor name, product name and release number. For example, an application manufactured by Company ABC called Max and having a release number of 2.0 would have a defined key created, for instance of ABCMax2.0, whereas, a computer system would generate a unique numeric value, for instance, the number 7, which is the key value that represents ABCMax2.0, and will be associated exclusively with ABCMax2.0. Thus, regardless of what server this particular application is installed on, the application will have the key value of 7. In one embodiment, the defined key is linked to the corresponding key value by a table, such that the numeric key value and not the defined key is recorded in the tool. This ensures that data pertaining to a particular product (for instance, a software application installed on different servers) can be inputted or cataloged into the tool in a consistent fashion.

Further, in one embodiment, the set of defined keys includes an application key for each of the business software applications employed in the enterprise, and a server key for each of the servers employed in the enterprise. More preferably, the set of defined keys also includes one or more of the following: a network device key for each of the network devices employed in the enterprise, a staff personnel key for each employee employed in the enterprise, and a process measurement key for each process and measurement employed in the enterprise. Again, each of these set of defined keys (application key, server key, network device key, etc.) has a respective key value which is a numeric key value that is unique to that particular item, be it an application, a server or a network device, and is a key value that can be cross-referenced throughout the tool. In particular, one can define a key in any format, preferably, in a format that is suitable or helpful in describing the product, for instance, in a format that identifies vendor, product and release number for an application. Moreover, in one embodiment, when inputting data into the computer tool, each software application module of a business software application is defined, also. Preferably, the tool has a defined key for each of the various software application modules making up each of the respective business software applications employed within an enterprise, so that no two software application modules have the same key value, but rather each software application module has a key value that is unique and which is cross-referenced throughout the tool. In this manner, an analysis can be easily conducted as to any one of the application modules themselves. Accordingly, each network device, employee and process or measurement employed within an enterprise can be represented with a key and a corresponding key value, so that data pertaining to these components may be uniformly entered into the tool and a meaningful analysis of the various business and technical aspects of the enterprise can be carried out.

Furthermore, the effective evaluation and analysis of a business enterprise and the information technology deployed within the enterprise comprises a multitude of business and technology factors. Accordingly, in one embodiment, the computer tool uses a defined rating system for each one of a set of business technology factors pertaining to the business components employed within an organization. Preferably, a defined rating system is used to rank one or more of the business technology factors, that is, only the application component and the server component in the tool. In one embodiment, the set of business technology factors include at least one of the following factors: business function, business fit, business criticality and software enterprise. As used herein, the term "business function" gives an indication of the value of the various business functions being performed or supported by a business software application. In other words, the business function factor gives an indication of how valuable a given business function being performed by an application is to the enterprise. In one embodiment, the ITDB tool has a preset list of business functions that a business professional can select from to define the business function(s) supported by a business software application. Preferably, the preset list of business functions includes: Advertising Management, Accounts Payable, Accounts Receivable, Benefits Management, Call Center, Campaign Management, Cash Management, Content Management, Customer Data Management, Employee Management, Facilities Management, Financial Reporting, Fixed Assets, Forecasting and Planning, General Ledger, Inventory Management, Logistics Management, Loyalty Program, Market Analysis, Merchandising, Order Processing, Payroll, Point of Sale, Project Accounting, Real Estate Management, Recruiting, Supply Chain Planning, Training, and Warehouse Management. However, this preset list of business functions can be tailored to meet the needs of or to be streamlined with the business functions of an organization or client, given that, for instance, an insurance company would have a list of business functions that are different than that of a manufacturing company. For rating or ranking the business function that is supported by a particular application, one selects an appropriate rating label (explained herein below) from a pull down menu in the tool.

Further, the term "business fit" as used herein provides a measure of whether a business software application is technologically aligned with goals and objectives of an organization/business, as well as provides a perspective of how well an application fits within a business or enterprise, that is, how well does the function delivered to the enterprise actually fit with the business function the enterprise is performing. For rating or ranking the business fit of a particular application, one selects an appropriate rating label (explained herein below) from a pull down menu in the tool. Moreover, the term "business criticality" provides a measure of the importance or significance of the business function supported by a particular business software application and/or server within an enterprise—that is, how critical a specific business software application and/or server is to the success/function of the enterprise. Preferably, business criticality provides a measure of not only the business software application and/or server, but also any server software application, including any server application modules. Again, for rating or ranking the business criticality of a particular application or server, one selects an appropriate rating label (explained herein below) from a pull down menu in the tool. Finally, as used herein, the term "software enterprise" gives an indication of the technical or technology compliance of a particular server and of business software applications using non-OS server software application modules (not specific server applications). For instance, software enterprise rating gives an indication of how various server software application modules fit into the organization's technology plan (versus a business plan), such as, how does an application that delivers certain business functions conform to a specific platform, etc. In particular, the focus is on evaluating how the technology employed by a given application fits within a desired architectural framework of the client, that is, its architectural fit. Similarly, for rating or ranking the software enterprise of a particular server, one selects an appropriate rating label (explained herein below) from a pull down menu in the tool. It is the combination of these business and technology factors, which are imperatives to effectively analyzing and evaluating information technology deployed in support of a business enterprise.

Referring to the defined rating system used in the tool, the defined rating system includes a set of rating labels and a corresponding set of rating values for each of the set of business technology factors, which are preferably linked by appropriate tables. For instance, the set of rating labels for rating "business function" are "perfect", "good", "okay" and "poor". The rating label "perfect" has a corresponding rating value of "1", the rating label "good" has a corresponding rating value of "2", the rating label "okay" has a corresponding rating value of "3" and the rating label "poor" has a corresponding rating value of "4". Similarly, the set of rating labels for rating "business fit" are "perfect", "good", "okay" and "poor". The rating label "perfect" has a corresponding rating value of "1", the rating label "good" has a corresponding rating value of "2", the rating label "okay" has a corresponding rating value of "3" and the rating label "poor" has a corresponding rating value of "4". The set of rating labels for "business criticality" are "statutory", "mission critical", "substantial impact", "perceived important" and "nice to have". The rating label "statutory" has a corresponding rating value of "0", the rating label for "mission critical" has a corresponding rating value of "1", the rating label of "substantial impact" has a corresponding rating value of "2", the rating label of "perceived important" has a corresponding rating value of "3" and the rating label of "nice to have" has a corresponding rating value of "4". Finally, the "software enterprise" factor has a rating system that includes a set of rating labels referred to as "core technology", "acceptable", "unacceptable" or "unrated technology". In particular, the rating label "core technology" has a corresponding rating value of "1", the rating label "acceptable" has a corresponding rating value of "2", the rating label "unacceptable" has a rating value of "3", and the rating label "unrated technology" has a corresponding rating value of "4".

In one embodiment, the ITDB tool uses a numeric rating value for the set of business technology factors, where a one (1) indicates a more desirable rating than a two (2), a two (2) indicates a more desirable rating than a three (3), and so forth—that is, the lower the rating, the better is the architectural fit or technology compliance of the application within the business or enterprise. Thus, for example, with respect to the Software Enterprise rating value, a software application scoring a one (1) (which corresponds to a rating label of core technology) will be closer in compliance than an application scoring a three (3) (which corresponds to a rating label of unacceptable). The rating associated with a specific business fit, criticality, etc.—even the specific terms themselves—are derived from the existing business lexicon of a client or organization. Where no previous lexicon for the rating labels has been developed, the default values within the tool are recommended to the client/organization. By applying this type of rating or ranking to one or more, or preferably, to all of the set of business technology factors pertaining to the existing Information Technology portfolio of the enterprise, a composite compliance or architectural fit score is rendered for the entire portfolio. For instance, if a client wants all of the applications to be aligned with the Rating Value of "1", one can conduct an analysis to see how the applications are actually rated with respect to one or more, or preferably, each of the set of business technology factors, and can determine what is necessary to reach the objective of getting closer to the rating value of "1". Thus, in addition to using a key value to identify a product and/or individual employed within an enterprise, the tool also uses the defined rating system as outlined herein above to rank one or more of the set of business technology factors (business function, business fit, business criticality and software enterprise) pertaining to the business or enterprise.

Further, in one embodiment, data is inputted into one or more forms of the computer tool for the business components, as shown in FIGS. 3B, 4B, 5B, 6B, 7B, 8B and 9B. Preferably, the business components include an application component, a server component, and more preferably also include one or more of the following: a network device component, a staff and personnel component, a process and measurements component, an account artifacts section and a business areas section. In one embodiment, there is no rating system associated with the network device component, the staff and personnel component, the process and measurements component, the account artifacts section nor the business areas section, but the data and/or information collected for these business information components can be evaluated or analyzed, for instance, to determine whether or not certain business objectives or goals are being met. For example, if an organization's objective is to reduce costs by way of adjusting staff/personnel, then an analysis can be done to see how many staff/personnel it takes to support an application. Similarly, if an organization is trying to streamline its vendors/supplier list, an analysis can be performed to see how many different vendors/suppliers are being used by that organization.

Referring to FIG. 1, numeral 100 illustrates an embodiment of the relationship between the computer tool, preferably, an integrated database tool (the ITDB tool) 110 and each of the various business components of an enterprise, namely, an application component 120, a infrastructure component 130, a staff and personnel component 140 and a process and measurement component 150. The infrastructure component includes a server component and a network device component. In particular, data pertaining to each of the business components is inputted into the ITDB tool (as indicated by the arrows), such that an analysis can be performed using the data inputted or entered into the computer tool 110. As mentioned herein, the ITDB tool has a series of forms for inputting data relating to the business and technical environment for each of these business components within an organization. Preferably, the ITDB tool has a series of forms for each of these business components that are linked to each other.

When an ITDB team or professional goes to a client, the team or professional first needs to decide what data/information needs to be collected that is unique to the client, so that the ITDB tool can be customized based on the client's objectives and desires. Based on initial discussions with the client, modifications are made to the content of the DB2® tables and the presentation of the MS Access® database user interface end. The pertinent data/information is inputted into the ITDB tool, preferably, for each of the application, server, network device, staff/personnel and process/measurement components, as well as for the account artifact and business area sections. All the information gathered is made available, preferably, in a single integrated DB2® instance, where the single instance has its own database and separate security, which other instances cannot access. Preferably, an instance of the Microsoft Access® database is stored on a network or web server, such that the data collected using the computer tool may be used by other sub-divisions within an organization, for instance, when preparing to take over the management of an Information Technology portfolio for a client. Further, the mechanism used for authenticating and accessing the data stored in the DB2® instance is a combination of a generally available authentication mechanism associated with ITDB specific authorization. Preferably, LDAP (Light-weight Directory Access Protocol) is used to authenticate a user using a user-id/password combination. Once authenticated, an Internet Database Connectivity (IDBC) connection (using a specific Open Database Connectivity (ODBC) definition on the client machine) is used to establish a connection to the authorization profile of the system users. A table look-up mechanism is used to determine if the just authenticated user is also authorized: if unauthorized, their access to the data is denied; otherwise, a table driven mechanism is used to allow the user to checkout data for which they are authorized. An ODBC connection is used to retrieve the data which is used by the MS Access® database user interface end.

In another embodiment, the invention provides a method of analyzing one or more of a plurality of business components employed in an enterprise. As used herein, the term "analyzing" is intended to comprise a multitude of tasks, such as, evaluating, assessing, comparing, managing, measuring, quantifying, scrutinizing, examining and/or studying the plurality of business components employed in an enterprise. The method comprises the steps of identifying at least one business or technology objective pertaining to the plurality of business components employed within an enterprise. In particular, the term "business components", preferably, includes an application component, a server component, a network device component, a staff and personnel component, a processes and measurements component, and, more preferably, also includes, an account artifact section and a business area section. Further, the method comprises providing a computer tool (the ITDB tool) that has a set of defined keys with respective key values for each of a plurality of business components used in the enterprise and the tool also has a defined rating system for each one of a set of business technology factors pertaining to the enterprise. The set of defined keys are as explained herein above. The method further comprises entering into the computer tool data pertaining to the business components using the respective key values. Furthermore, the method comprises ranking using the defined rating system in the computer tool, one or more of the set of business technology factors. Finally, the method comprises running an analysis report to analyze one or more of the business components based on the data inputted using the respective key values and the ranked set of business technology factors and the business or technology objective identified with respect to the enterprise. Further, preferably, the method includes implementing or taking appropriate steps, based on the results of the analysis report, in order to achieve the objective or objectives identified by the client. For instance, an organization is trying to establish a preferred vendor/supplier list, then an analysis can be performed to see how many different vendors/suppliers are being used by that organization, and accordingly, the organization can choose to purchase and install products only from the preferred vendor/supplier based on the results of the analysis report.

In order to run an analysis report, preferably, a set of algorithms or scripts that correspond to a set of reports are provided for performing a certain analysis with respect to the business components employed within the enterprise. The set of reports are accessed in the Reports form shown in FIG. 10. Thus, one can select an appropriate report corresponding to the identified objective from the set of reports or can create an algorithm or script that is appropriate. For example, one can utilize the Business Function report listed under Application Reports in FIG. 10 to conduct an analysis to find out the Business Function Score or Business Function Rating Score of business software applications. The Business Function Score analysis is done to provide the number of applications delivering business functions as defined by the client. This is done to draw focus upon those business functions which are supported by multiple applications. The algorithm or script for a particular report uses specific reference tables (Table_Name) and specific fields (Field_Name) to access the data that has been inputted or entered into the Tool, thus, having a format of: Table_Name.Field_Name. An example of an algorithm or script for the Business Function Score follows. For each application which has recorded a Business Function, do the following: DB2_Ref_Business_Function.Business_Function (group by application Business Function delivered—listed in the first column in Table A). Then, for each group of Business Function, do the following: Average of DB2_Ref_Criticality.Rating (listed in the second column in Table A); Average of DB2_Ref_Business_Fit.Rating (listed in the third column in Table A); Count of DB2_App Business_Function.App_Bus_Func (listed in the last column in Table A). In particular, the line "Average of DB2_Ref_Criticality.Rating" looks up the database table "DB2_Ref_Criticality" and looks up the field "Rating" in that table, and calculates the average Business Criticality Rating for that particular business function. Similarly, the line "Average of DB2_Ref_Business_Fit.Rating" looks up the database table "DB2_Ref_Business_Fit" and looks up the field "Rating in that table, and calculates the average Business Fit Rating for that particular business function. The line "Count of DB2_App_Business_Function.App_Bus_Func" looks up the database table "DB2_App_Business_Function" and looks up the field "App_Bus_Func" in that table. This calculates the number of applications delivering the specific Business Function grouped. The results can be displayed in a chart, for instance, where the Business Criticality Rating can be graphically displayed on a X-Axis of a chart, where the Business Fit Rating can be graphically displayed on a Y-Axis of a chart, and whereas the number of applications can be displayed next to the respective symbols for each of the business functions being delivered. Alternatively, the results can be displayed in a table as shown below in Table A:

TABLE A

| Group by Business Function | Average of Criticality Rating | Average of Business Fit Rating | Count of # Of Applications |
|---|---|---|---|
| Finance | 3.5 | 2.25 | 4 |
| Human Resources | 3 | 1.5 | 2 |
| Planning | 2.666666667 | 3.333333333 | 3 |
| Sales and Marketing | 2.6 | 2.8 | 15 |

Based on the analysis results provided in the Business Function Score report above, an organization can implement or take appropriate steps necessary to achieve a specific technical or business objective specified by the client, so that the identified or specified objective is met. For instance, with the objective being to reduce the number of applications providing duplicative business functions, then one can consider the analysis results provided in Table A to see which applications provide the most business functions and to reduce the number of applications in a given business function category accordingly.

A similar algorithm can be provided for conducting an analysis as to the number of business software application users within each business function delivered, so that an organization can focus on those business functions which are impacting the most number of users. An example of an algorithm or script for calculating the number of users of applications delivering a specific business function follows. For each application which has recorded a Business Function, do the following: Group by application Business Function delivered: DB2_Ref_Business_Function.Business_Function (listed in the first column in Table B). Then, for each Group of Business Function: Average of DB2_Ref_Criticality.Rating (listed in the second column in Table B); Average of DB2_Ref_Business_Fit.Rating (listed in the third column in Table B); Sum of DB2_App_Bus_Summ.Number_Of_Users (listed in the last column in Table B). In particular, the line "Average of DB2_Ref_Criticality.Rating" looks up the database table "DB2_Ref_Criticality" and looks up the field "Rating" in that table, and calculates the average Business Criticality Rating for that particular business function. Similarly, the line "Average of DB2_Ref_Business_Fit.Rating" looks up the database table "DB2_Ref_Business_Fit" and looks up the field "Rating in that table, and calculates the average Business Fit Rating for that particular business function. The line "Sum of DB2_App_Bus_Summ.Number_Of_Users" looks up the database table "DB2_App_Bus_Summ" and looks up the field "Number_of_Users" in that table. This calculates the number of users of applications delivering the specific Business Function grouped. Again, the results can be displayed in a chart, for instance, where the Business Criticality Rating can be graphically displayed on a X-Axis of a chart, where the Business Fit Rating can be graphically displayed on a Y-Axis of a chart, and whereas the number of users of applications can be displayed next to the respective symbols for each of the business functions being delivered. Alternatively, the results can be displayed in a table as shown below in Table B:

TABLE B

| Group by Business Function | Average of Criticality Rating | Average of Business Fit Rating | Sum of Application Users |
|---|---|---|---|
| Finance | 3.5 | 2.25 | 2272 |
| Human Resources | 3 | 1.5 | 1070 |
| Planning | 2.666666667 | 3.333333333 | 77 |
| Sales and Marketing | 2.6 | 2.8 | 9376 |

Again, based on the results of the report above, an organization can implement or take appropriate steps necessary to achieve a specific technical or business objective specified by the client, so that the identified or specified objective is met. For instance, an objective can be to improve support for applications that deliver a business function which have the most number of users, then the analysis results in Table B can be used to improve support in the Sales and Marketing business applications within the enterprise.

Preferably, the data pertaining to the plurality of business components is entered into one or more forms of the computer tool using the respective key values and the defined rating system for the set of business technology factors. Moreover, in one embodiment, a defined key is created for one or more of the business components (as described herein above), where each of the defined keys has a respective key value. Further, each of the respective key values corresponding to a defined key is a unique numeric value that is preferably randomly generated. Preferably, the defined key is linked to the corresponding key value by a table. Furthermore, one or more, preferably, each of the set of business technology factors (business function, business fit, business criticality and software enterprise) is ranked using the defined rating system in the tool, which includes a set of rating labels that are linked via tables to a corresponding set of rating values, as described herein above.

Accordingly, the ITDB tool can be used to create concise documentation of the business and technical environment of existing Information Technology deployed within an enterprise and to analyze one or more of a plurality of business components employed in an enterprise. For instance, the ITDB tool can be used to determine the best fit server to run a particular business software application on, such that, the server that has most of the software application modules required to run the particular business software application is chosen. A best fit server analysis is not the same as an architectural fit analysis in that a server may be found that is fit to run a particular business software application, but the server may not be in line with a desired architectural fit.

Further, the ITDB tool can be used for managing or taking over management of an Information Technology portfolio of a client. When taking over management of an Information Technology portfolio, the tool provides a mechanism for collecting client Information Technology data from the beginning of an engagement, through transition and into delivery. The Information Technology data collected is used to assess the Information Technology portfolio in order to take over the management of an Information Technology portfolio for a client. Further, the ITDB tool can be used to evaluate or assess an Information Technology portfolio in order to transform from an existing business and technical environment to that of a target business and technical environment. For example, a client can identify or specify as an objective or desire that all business software applications requiring a database use a specific company's database product and use a particular release of the product (referred to as the target environment). This objective would be carried out by running an analysis report (that is, choosing the appropriate algorithm corresponding to the objective set forth by the client) to evaluate the existing database product(s) being used by the client and comparing it to the objective specified by the client, in order to achieve the target environment specified by the client. Thus, the ITDB tool is used to manage one or more of the business components by evaluating/analyzing not only the business software applications being used by an organization, but the different software application modules within the business software applications themselves, along with the business fit, the business functions, the value of those business functions that are being delivered to the organization, and whether the technology that is being used can actually deliver those functions—that is, the entire Information Technology portfolio is considered.

In yet another embodiment, the invention provides a system that comprises a computer terminal or an equivalent device, or preferably, a computer readable storage medium or more preferably, a programmable medium containing programmable software in a form that is executable by a computer system to evaluate architectural fit of a plurality of business software applications used within an enterprise. The programmable software comprises the steps of accessing a defined key table for a plurality of business components and a rating table for each one of a set of business technology factors. The programmable software further comprises inputting, in a memory, data for the plurality of business components using respective key values from the defined key table corresponding to the business components and ranking one or more of the set of business technology factors using the respective rating values from the rating table. Furthermore, the programmable software comprises executing an analysis to evaluate architectural fit of the plurality of business software applications based on the data inputted using the respective key values and the ranked set of business technology factors.

Preferably, the inputted or cataloged data, which forms the basis of the evaluations or analyses, may be performed either on a database program on a computer terminal, or on a server linked to an electronic network, or on a client PC linked to an electronic network. Preferably, the inputted or cataloged data is stored in a memory either internal to the computer terminal or external to the terminal, preferably, on a server. Preferably, the defined key table contains a set of defined keys and corresponding key values for one or more of the business components, and the rating table contains a set of rating labels and corresponding rating values for the set of business technology factors, as explained herein above. In one embodiment, the set of business technology factors comprises at least one of, more preferably, each of the following: business function, business fit, business criticality and software enterprise. Furthermore, the analysis results, for instance, graphs or tables, may be displayed either on a visual display, such as, a computer monitor screen, printed out or stored in a memory either internal to the terminal or on a storage media, such as a disc, for later use.

Figure 2:
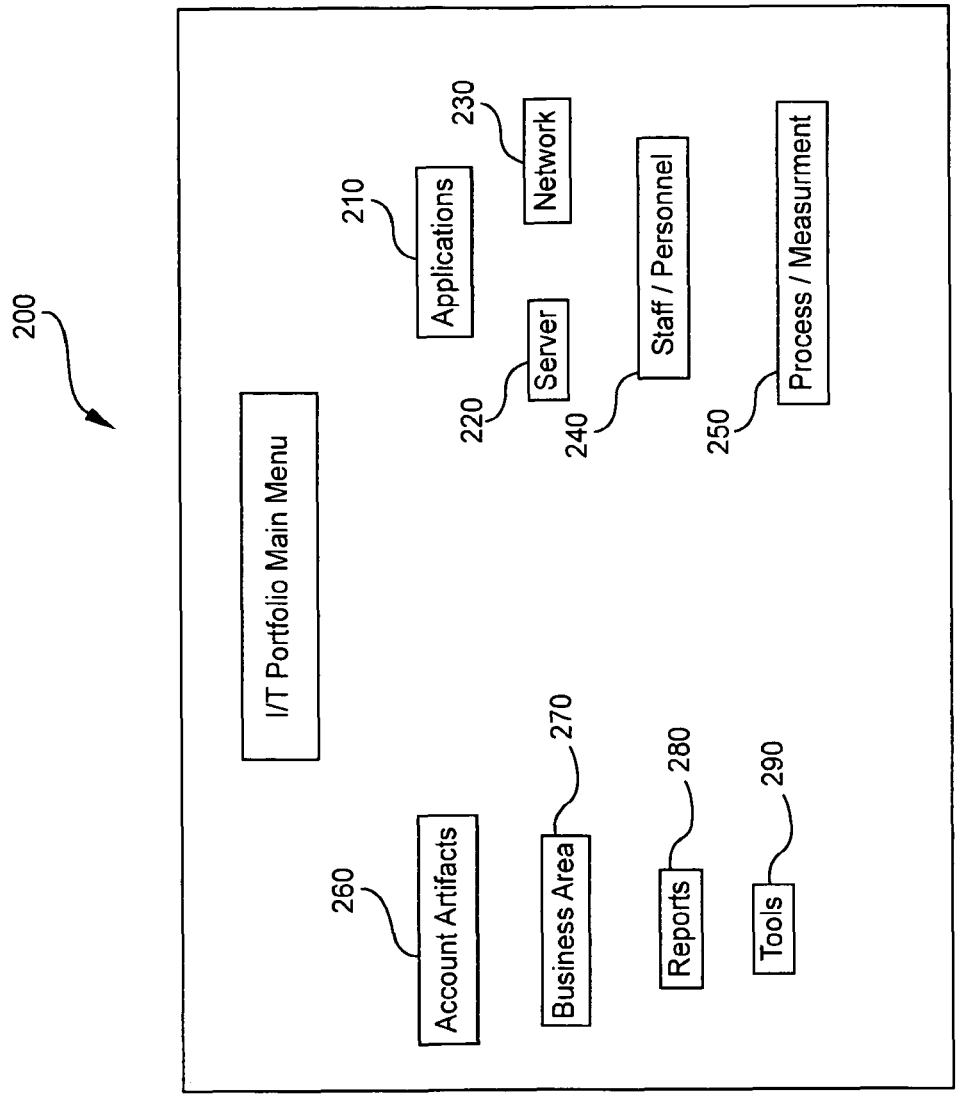
FIG. 2 shows an example of a Main Menu of a computer tool, in accordance with an embodiment of the invention.
Figure 3A:
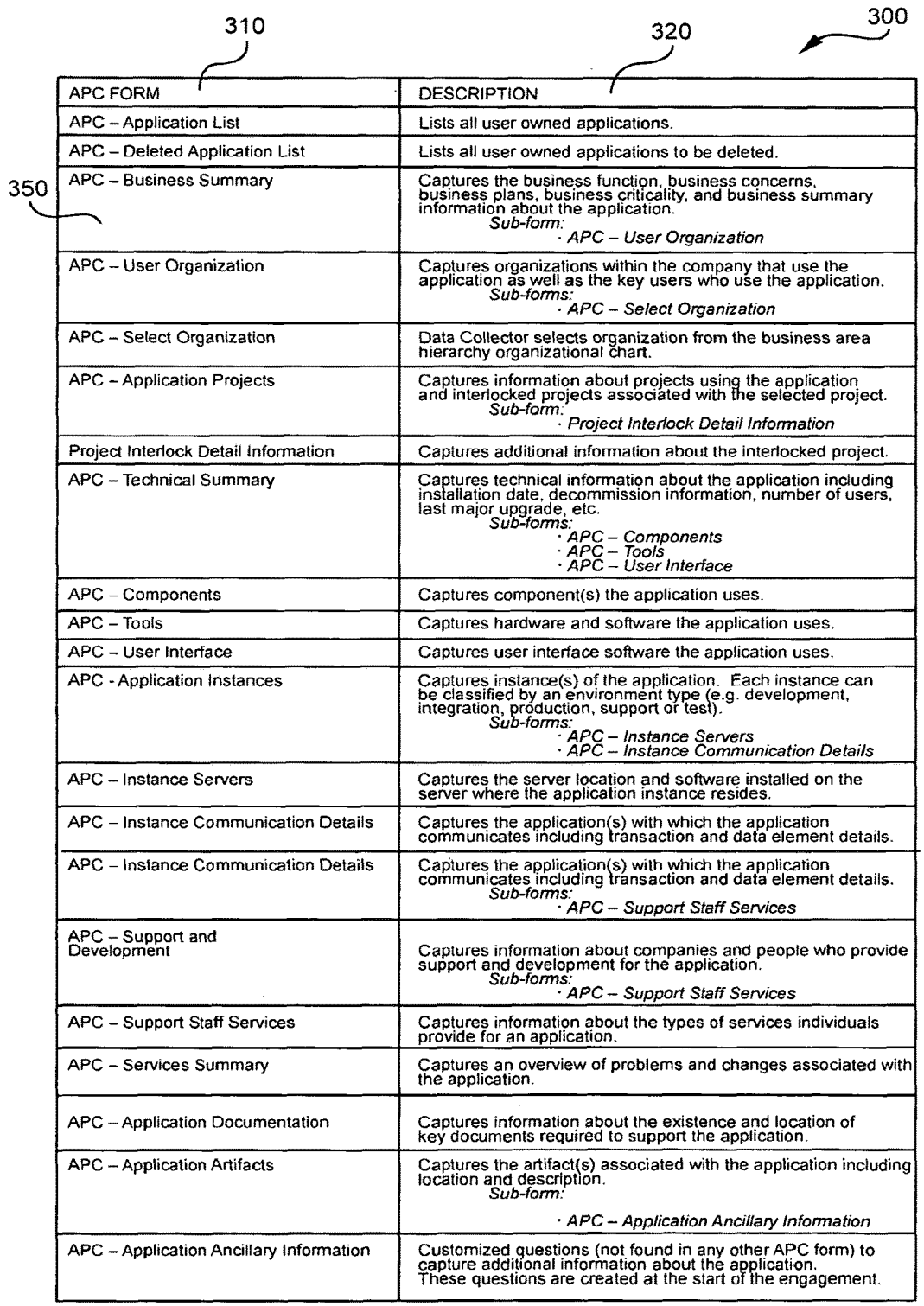
FIG. 3A is a table listing the various forms as well as descriptions of the data inputted into an Applications Profiling Component (APC) of a computer tool, in accordance with an embodiment of the invention.
Figure 3B:
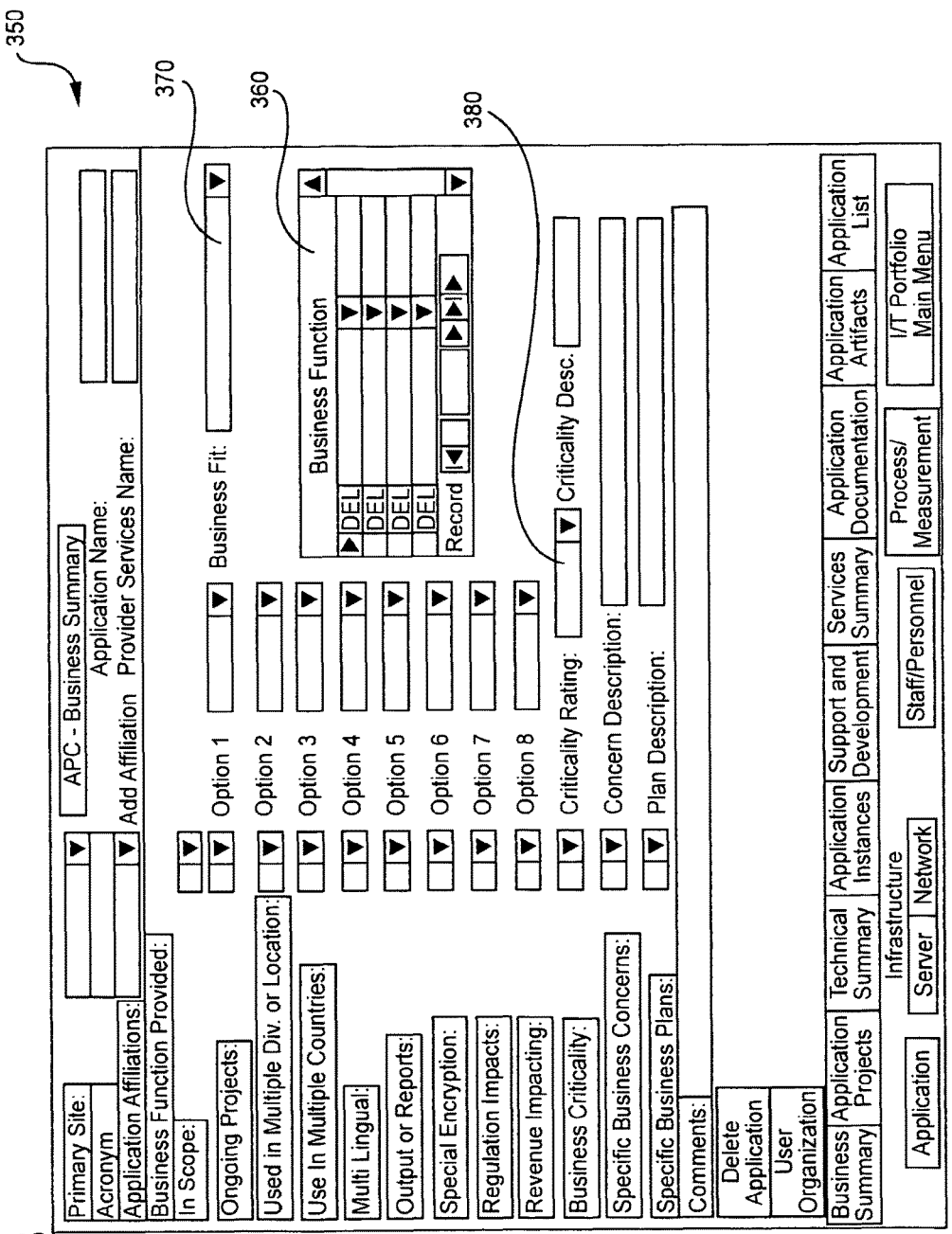
FIG. 3B shows an example of a Business Summary form included in an Applications Profiling Component (APC) of a computer tool, in accordance with an embodiment of the invention.

Reference is now made to FIGS. 2-10 of the drawings. FIG. 2 shows an example of an "I/T Portfolio Main Menu" form of a computer tool, preferably, an Information Technology Portfolio Database (ITDB) tool, more preferably, a Microsoft Access® database tool, in accordance with an embodiment of the invention. In particular, FIG. 2 depicts the I/T Portfolio Main Menu form 200 having navigation buttons to gain access to each of the business components, namely, Applications 210, Server 220, Network 230, Staff/Personnel 240, Process/Measurement 250, Account Artifacts 260, Business Area 270, as well as a button for Reports 280 (that is, for accessing various analyses reports included in the tool) and a button for Tools 290 (which provides the means of executing specific Microsoft Access database tool interfaces that have been developed to interface with ITDB). A list of the various forms included in one embodiment of the tool is shown in FIGS. 3A, 4A, 5A, 6A, 7A, 8A and 9A. In particular, FIGS. 3A, 4A, 5A, 6A, 7A, 8A and 9A each list in a table format the various forms as well as describe the information that can be entered into each of the respective forms in one embodiment of the computer tool. For instance, the table 300 in FIG. 3A shows under "APC—Form" in column 310 the various forms included in the Application Profiling Component (APC) of the computer tool, as well as provides a brief description under "Description" in column 320 of the data that is to be inputted into each of the respective forms listed. Further, many of the forms within a business component have links to sub-forms, preceded with the symbol "•", as shown in the "Description" column 320 of the "APC Forms" table 300. A business professional or a team using the tool clicks on the "Applications" button on the "PT Portfolio Main Menu" (shown in FIG. 2), which leads to the "Application List" form (not explicitly shown in the diagrams), which contains, among other data, "Application Name" and "Business Function". On the "Application List" form one can select an existing application and/or add a new application. If there are existing applications, one can click on anyone of the applications listed to get to an "APC—Business Summary" form 350 (shown in FIG. 3B), that is, the "Business Summary" form for the Application Profiling Component (APC). FIG. 3A shows a brief description of the information entered into the "APC—Business Summary" form 350. As shown on the bottom of FIG. 3B, the "APC—Business Summary" form 350, there are navigation buttons "Application", "Server", "Network", "Staff/Personnel", "Process/Management" and "I/T Portfolio Main Menu" that allow a user to switch between each of these respective business components as well as to switch to the main menu (shown in FIG. 2). Also, as shown in FIG. 3B, the "APC—Business Summary" form 350 has links to other forms (via buttons on the bottom of the form), such as, "Application Projects", "Technical Summary", "Application Instances", "Support and Development", "Services Summary", "Application Documentation", "Application Artifacts" as well as a link to the "Application List" form (a brief description of the data to be inputted into these forms is provided in FIG. 3A). Preferably, if a sub-form exists for that particular form, button(s) appear above the appropriate form button to allow access to the sub-form(s). For instance, the "Business Summary" form has a link to a sub-form "User Organization" (shown above the Business Summary button in FIG. 3B), the "Technical Summary" form has links (not explicitly shown in any of the diagrams, but only listed in Table 300 of FIG. 3A) to the sub-forms "Application Components", "Application Tools" and "User Interface", whereas, the "Application Artifacts" form has a link to sub-form "Application Ancillary Information". Preferably, the currently active form is highlighted (not shown in any of the figures). In one embodiment, the following application information can be collected in the Application Profiling Component (APC): business summary (business function, in scope, business criticality, business concerns, etc.), organizations and key users who use the application, projects using the application, technical information (user interface, components and tools), application instances (server information and communication details), support and development of the application, services (number of problems per month, scheduled and unscheduled changes, etc.), documentation (user guide, installation guide, etc.), application artifacts, ancillary information (customized questions pertaining to applications).

Figure 4B:
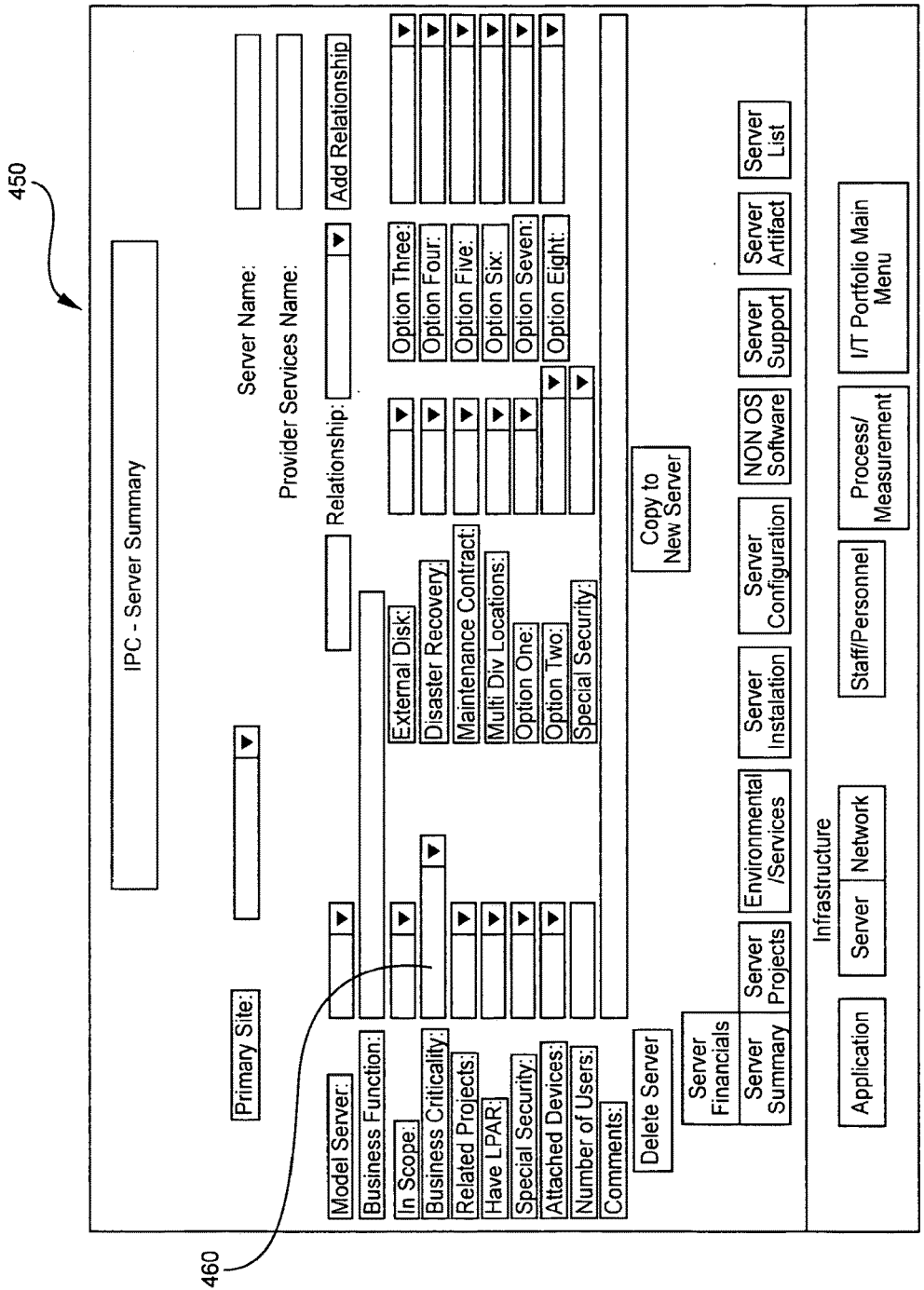
FIG. 4B shows an example of a Server Summary form included in a server component of an Infrastructure Profiling Component (IPC) of a computer tool, in accordance with an embodiment of the invention.

Similarly, Table 400 in FIG. 4A shows in column 410 under "IPC Form (Server)" the various forms included in the Server component of the Infrastructure Profiling Component (IPC) of the computer tool, as well as provides under in column 420 a brief "description" of the data that is to be inputted into each of the respective forms listed. The Infrastructure Profile Component preferably includes both the Server component and the Network Device component. Similar to the Application Profiling Component, clicking on the "Server" button of the "Main Menu" (in FIG. 2) leads to the "Server List" form (not shown in any of the drawings), which, among other data, contains the "Server Name", "Site Name" and "Host Name". On the "Server List" form one can select an existing server and/or add a new server. If there are existing servers, one can click on anyone of the servers listed tog get to a "IPC—Server Summary" form 450 (shown in FIG. 4B). FIG. 4A shows a brief description of the information entered into the "IPC—Server Summary" form 450. The "IPC—Server Summary" form has links to other forms on the bottom of the form, such as, "Server Summary", "Server Projects", "Environment/Services", "Server Installation", "Server Configuration", "Non-OS Software", "Server Support", "Server Artifact" as well as a link to the "Server List" form (as shown by the buttons at the bottom of FIG. 4B). Further, many of the forms have links to sub-forms as listed in table 400 of FIG. 4A. For instance, the "Server Summary" form has a link to a sub-form "Server Financials" (the button for which is shown above the Server Summary button), the "Server Configuration" form has a link to the "Server Network Access" form (not shown in any of the drawings), whereas, the "Server Artifacts" form has a link to sub-form "Server Ancillary Information" (not shown in any of the drawings).

Figure 5B:
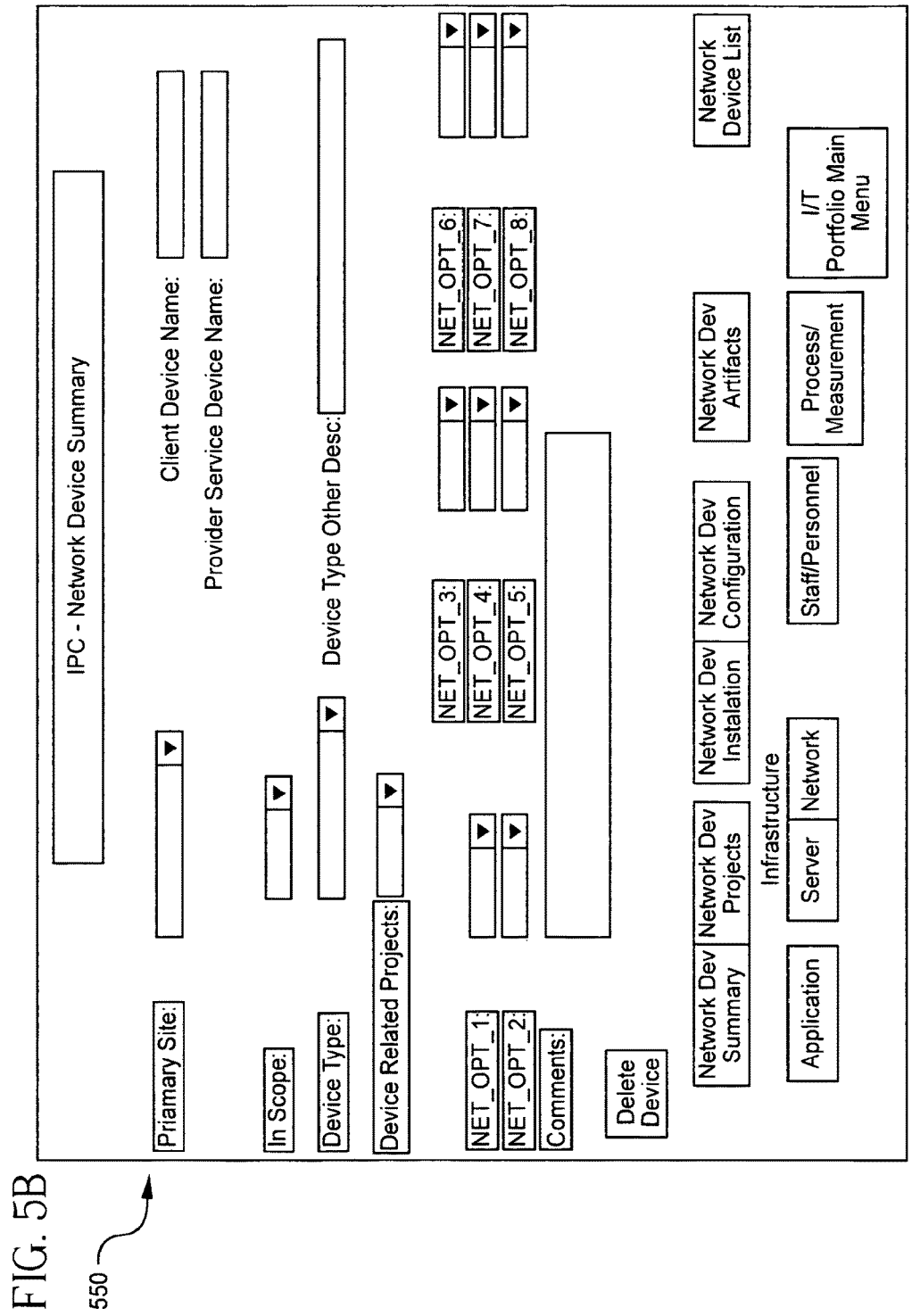
FIG. 5B shows an example of a Network Device Summary form included in a network device component of an Infrastructure Profile Component (IPC) of a computer tool, in accordance with an embodiment of the invention.

Turning to FIG. 5A, table 500 shows in column 510 under "IPC—Form (Network Device)" the various forms included in the Network Device component of the Infrastructure Profiling Component (IPC) of the computer tool, as well as provides under "Description" in column 520 a brief description of the data that is to be inputted into each of the respective forms listed. Clicking on the "Network" button of the "Main Menu" (shown in FIG. 2) leads to the "Network Device List" form (not shown in any of the drawings), which includes data, such as "Network Device Name", "Site Name" and "Device Type". On the "Network Device List" form, one can select an existing device or add a new device. If there are existing devices, one can click on anyone of the devices listed to get to an "IPC—Network Device Summary" form 550 (shown in FIG. 5B). The "IPC—Network Device Summary" form 550 has links to the forms "Network Device Projects", "Network Device Installation", "Network Device Configuration", "Network Device Artifacts" as well as a link to the "Network Device List" form (as shown by the buttons on the bottom of FIG. 5B). Further, as shown in table 500 of FIG. 5A, the "Network Device Configuration" form has a link to the "Network Device Access" sub-form (not shown in any of the drawings) and the "Network Device Artifacts" form has a link to the sub-form "Network Device Ancillary Information" (not shown in any of the drawings). Preferably, the following application information can be collected in the Infrastructure Profiling Component (IPC), which includes servers and network devices: server summary (business function, in scope, business criticality, number of users, etc.), financial information about the server, projects using the server, technical information (environment, services, installation and configuration), non-OS (non-operating system) software installed on the server, support of the server (companies, employees), server artifacts, ancillary information (customized questions pertaining to servers), network device summary (in scope, device type, etc.), projects using the network device, technical information (installation and configuration), network device artifacts, ancillary information (customized questions pertaining to network devices).

Similarly, in FIG. 6A, table 600 shows under "SPC Form" in column 610 the various forms included in the Staff and Personnel Component (SPC) of the computer tool, as well as provides under "Description" in column 620 a brief description of the data that is to be inputted into each of the respective forms listed. Clicking on the "Staff/Personnel" button on the "Main Menu" (shown in FIG. 2), leads to the "Staff and Personnel List" form (not shown in any of the drawings), which includes the names, telephone numbers and e-mail addresses of employees. On the "Staff and Personnel List" form, one can select an existing employee or add a new employee. If there are existing employees, one can click on anyone of the employees listed to get to a "SPC—Summary" form 650 (shown in FIG. 6B), which has links to a "Job(s)" form, a "Financials" form, a "Process and Measurement" form, as well as a link to the "Staff and Personnel List" form (the respective buttons are shown on the bottom of FIG. 6B). Preferably, the following application information can be collected in the Staff and Personnel (SPC) component of the tool: summary information (first and last name, contact information), employee classification (position type, manager or regular employee, account role), jobs and tasks, financial information, and process and measurements used.

Figure 7B:
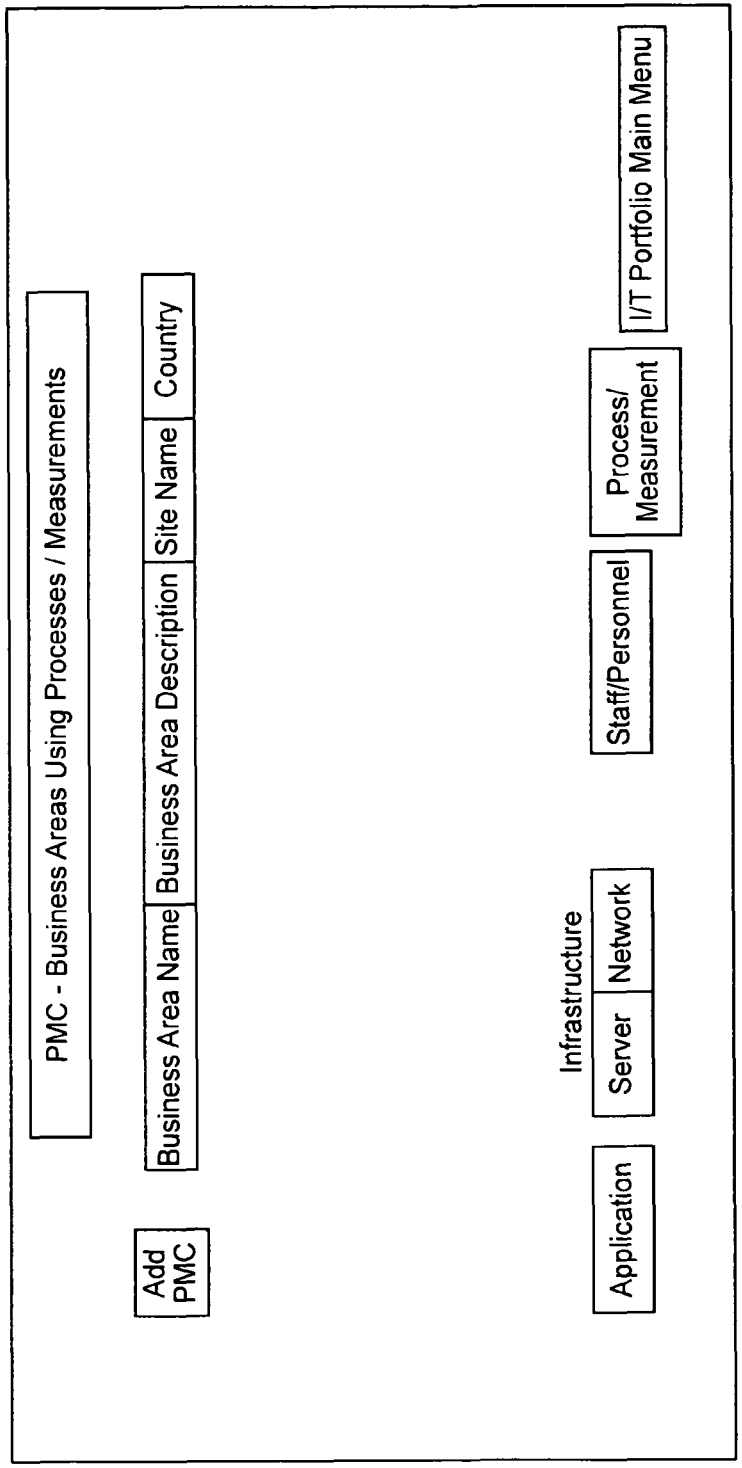
FIG. 7B shows an example of a Business Areas Using Processes/Measurements form of a Process and Measurements Component of a computer tool, in accordance with an embodiment of the invention.

Table 700 in FIG. 7A shows in column 710 under "PMC Form" the various forms included in the Process and Management Component (PMC) of the computer tool, as well as provides under "Description" in column 720 a brief description of the data that is to be inputted into each of the respective forms listed. Clicking on the "Process/Measurement" button on the "Main Menu" (shown in FIG. 2), leads to the "Business Areas Processes/Measurements List" form, which includes a list of Business Areas for which process and measurement data has been or will be collected. On the "Business Areas Processes/Measurements List" form, one can select an existing Process/Measurement or add a new Process/Measurement. If there are existing Processes/Measurements, one can click on any one of the existing Processes/Measurements listed to get to a "Processes/Measurements Business Areas Using Processes/Measurements" form 750 (shown in FIG. 7B). Further, the Process/Measurements Component of the tool also includes a "Processes/Measurements Business Area Summary" form and a PMC—Process/Measurements Details" form (not shown in any of the drawings). In the Process and Measurement Component of the tool, a customized, predefined list of processes and measurements associated with specific Business Areas of the engagement can be collected. Some examples of processes and measurements preferably include: help desk, disaster recovery, change management, and customer satisfaction.

Figure 8A:
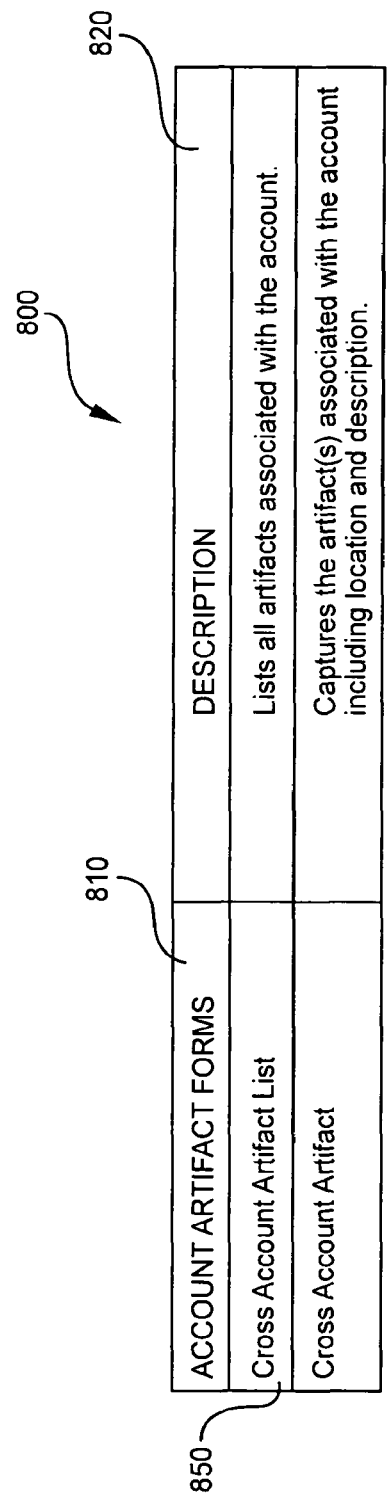
FIG. 8A is a table listing the various forms as well as descriptions of the data inputted into an Accounts Artifacts section of a computer tool, in accordance with an embodiment of the invention.
Figure 8B:
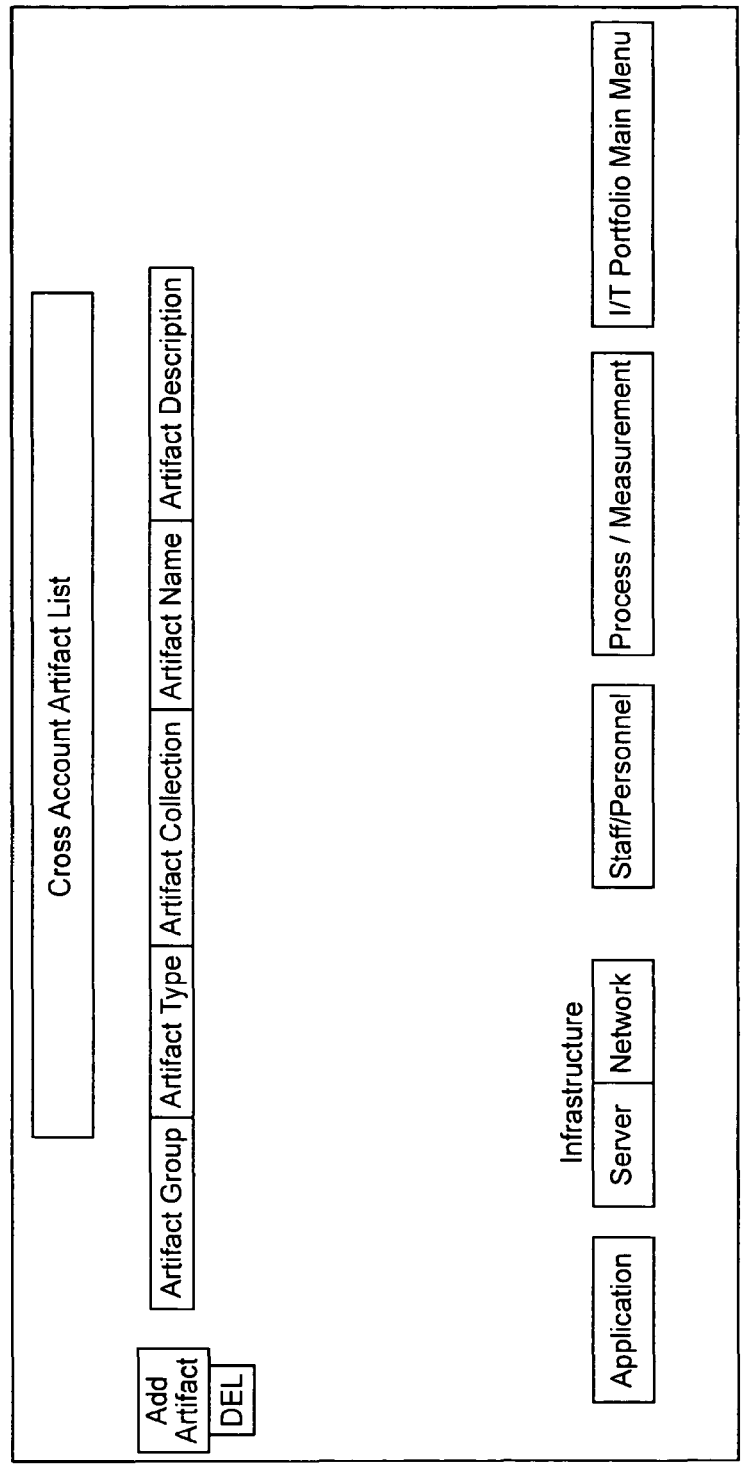
FIG. 8B shows an example of a Cross Account Artifact List form of an Account Artifacts section of a computer tool, in accordance with an embodiment of the invention.

In FIG. 8A, table 800 shows under "Account Artifact Form" in column 810 the various forms included in the Account Artifacts section of the computer tool, as well as provides under "Description" in column 820 a brief description of the data that is to be inputted into each of the respective forms listed. Clicking on the "Account Artifacts" button of the "Main Menu" (shown in FIG. 2) leads to the "Cross Account Artifact List" form 850 (shown in FIG. 8B), which includes all the artifacts associated with the account. On the "Cross Account Artifact List" form 850, one can select an existing artifact or add a new artifact. If there are existing artifacts, one can click on any one of the Account Artifacts listed to get to the "Cross Account Artifact" form. The Account Artifacts section captures data/information, such as, service agreements with other companies, site plans, raised floor architectural diagrams, etc. Preferably, the following Account Artifacts information can be collected: type of artifact (business, legal, technology or other), how is the artifact collected (automatic, email, interview, physical), artifact name and a description, origin of the artifact, and artifact existence and location.

In FIG. 9A, table 900 shows under "Business Area Form" in column 910 the various forms included in the "Business Area" section of the computer tool, as well as provides under "Description" in column 920 a brief description of the data that is to be inputted into each of the respective forms listed. Clicking on the "Business Area" button of the "Main Menu" (shown in FIG. 2) leads to the "Business Area List" form (only the button is shown in FIG. 9B), which includes all Business Areas associated with a business or enterprise. On the "Business Area List" form, one can select an existing Business Area or add a new Business Area. If there are existing Business Areas, one can click on anyone of the Business Areas listed to get to a "Business Area Summary" form 950 (shown in FIG. 9B), which has links to the "Business Area Financials", "Business Area Ancillary" and "Business Area List" forms (the buttons are shown towards the bottom on FIG. 9B). Table 900 in FIG. 9A lists a brief description of the information entered into each of these forms. The Business Area section captures the business organizational structure of a business or enterprise. The following Business Area information can be collected: Business Area name and description, Business Area hierarchy (report to Business Area), Business Area ancillary information (customized, predefined list of questions), Business Area financial (questions regarding financial aspects for the current year and projections for the following year).

Figure 10:
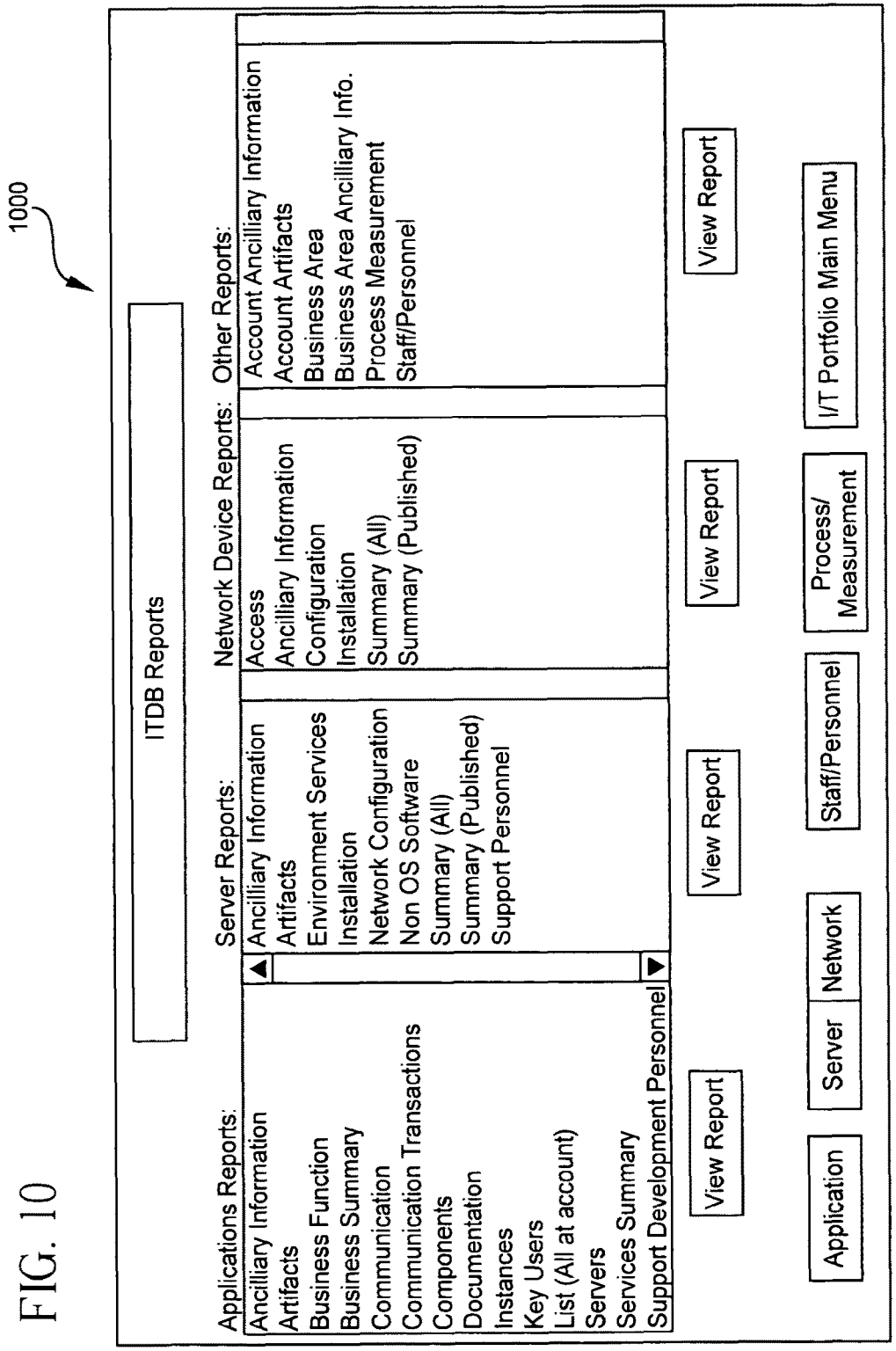
FIG. 10 shows an example of a Reports form of a Reports section of a computer tool, in accordance with an embodiment of the invention.

FIG. 10 shows the ITDB Reports form 1000, which can be accessed using the "Reports" button on the "Main Menu" of FIG. 2. The Reports section provides a list of reports and, in one embodiment, is divided into "Application Reports", "Server Reports", "Network Device Reports", and "Other Reports". The following reports are listed in the "Application Reports" portion: Ancillary Information, Artifacts, Business Function Business Summary, Communication, Communication Transactions, Components, Documentation, Instances, Key Users, List (All At Account), Servers, Services Summary, Support/Development Personnel, Technical Summary, Tools-Hardware, Tools-Software, User Interfaces, and User Organization. The following reports are listed in the "server reports" portion: Ancillary Information, Artifacts, Environment Services, Installation By Group, Installation By Site, Installation Detail, Network Configuration, Non-OS Software, and Summary List. The "Network Device Reports" portion includes the following reports: Access, Ancillary Information, Configuration, Installation, and Summary. The "Other Reports" portion includes the following: Account Ancillary Information, Account Artifacts, Business Area, Business Area Ancillary Information, Process/Measurement and Staff/Personnel. A user selects one of these reports and clicks on the associated "View Report" button on the bottom to access the report.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer system comprising:
   a processor, a computer readable memory, and a computer readable storage medium;
   first program instructions to provide a computer tool with a defined rating system for a business software application, wherein the defined rating system establishes a rating of how effective the business software application is in meeting pre-determined requirements for each one of a set of business technology factors, wherein the set of business technology factors comprises:
      a business function factor, wherein the business function factor is defined as a measure of how successful the business software application is in meeting user-defined needs for operations within an enterprise,
      a business fit factor, wherein the business fit factor is defined as a measure of how successful the business software application is in meeting stated goals of the enterprise,
      a business criticality factor, wherein the business criticality factor is defined as a measure of how critical the operations within the enterprise are to meeting the stated goals of the enterprise, and
      a software enterprise factor, wherein the software enterprise factor is defined as a measure of how compatible the business software application is with existing servers in the enterprise;
   second program instructions to receive an input, into said computer tool, of rating values for the business software application, wherein the rating values describe how effective the business software application is in meeting the pre-determined requirements of each one of the set of business technology factors;
   third program instructions to conduct an architectural fit analysis to evaluate an architectural fit of said business software application based on inputted said rating values, wherein the architectural fit analysis is performed by the processor utilizing inputted said rating values for the business software application and other software applications for comparing the business software application with the other software applications, wherein said comparing determines which software application provides a best architectural fit based on inputted rating values for the business software application and the other software applications;

fourth program instructions to generate an analysis report based on the architectural fit analysis, wherein the analysis report describes which software application provides the best architectural fit for meeting the pre-determined requirements for all of the set of business technology factors;

fifth program instructions to identify a best fit server from multiple servers within the enterprise, wherein the best fit server has more software application modules required to run the business software application as compared to other servers within the enterprise; and sixth program instructions to automatically install a software application that provides the best architectural fit for meeting the pre-determined requirements for all of the set of business technology factors on the best fit server; and wherein the first, second, third, fourth, fifth, and sixth program instructions are stored on the computer readable storage medium for execution by the processor via the computer readable memory.

2. The computer system of claim 1, further comprising:
seventh program instructions to generate a graph of the analysis report, wherein the graph compares architectural fits for the business software application and the other software applications; and eighth program instructions to display the graph on a monitor; and wherein the seventh and eighth program instructions are stored on the computer readable storage medium for execution by the processor via the computer readable memory.

3. The computer system of claim 1, further comprising:
seventh program instructions to assign a defined key to the business software application, wherein the defined key identifies a vendor, a product name, and a release number of the business software application;

eighth program instructions to associate a randomly generated numeric key value to the defined key, wherein the randomly generated numeric key value is a numeral;

ninth program instructions to assign the randomly generated numeric key value to the business software application;

tenth program instructions to install the business software application on multiple servers, wherein the business software application is identified on all of the multiple servers by the randomly generated numeric key;

eleventh program instructions to receive the inputted said rating values onto the multiple servers; and twelfth program instructions to associate the inputted said rating values from the multiple servers with the randomly generated numeric key, wherein the inputted said rating values are inputted into the computer tool in a consistent fashion; and wherein the seventh, eighth, ninth, tenth, eleventh, and twelfth program instructions are stored on the computer readable storage medium for execution by the processor via the computer readable memory.

4. The computer system of claim 1, wherein architectural fit is defined as describing how adequately a software application integrates into a complete Information Technology (IT) environment and organization to meet the user-defined needs of the operations within the enterprise.

5. The computer system of claim 1, further comprising:
seventh program instructions to set a minimum rating value for the business software application based on the business technology factors; and eighth program instructions to, in response to the business software application failing to meet the minimum rating value, adjust the operations within the enterprise until the business software application meets the minimum rating value; and wherein the seventh and eighth program instructions are stored on the computer readable storage medium for execution by the processor via the computer readable memory.

6. The computer system of claim 1, further comprising:
seventh program instructions to determine how many users within the enterprise are utilizing the business software application; and eighth program instructions to adjust technical support for the business software application according to how many users within the enterprise are determined to be utilizing the business software application; and wherein the seventh and eighth program instructions are stored on the computer readable storage medium for execution by the processor via the computer readable memory.

7. The computer system of claim 1, further comprising:
seventh program instructions to utilize the analysis report to determine which server within the enterprise is best suited to run the business software application; and eighth program instructions to install the business software application on a server that is best suited to run the business software application; and wherein the seventh and eighth program instructions are stored on the computer readable storage medium for execution by the processor via the computer readable memory.

8. The computer system of claim 1, further comprising:
seventh program instructions to identify a first software application and a second software application on a server, wherein the first software application and the second software application each provide a same business function; and eighth program instructions to remove the second software application from the server, thereby saving memory space and avoiding a duplicative business function provided by the server; and wherein the seventh and eighth program instructions are stored on the computer readable storage medium for execution by the processor via the computer readable memory.

9. A computer program product for evaluating an architectural fit of a business software application employed in an enterprise, the computer program product comprising:
a non-transitory computer readable storage medium having stored and encoded thereon:
first program instructions executable by a processor to cause the processor to provide a computer tool with a defined rating system for a business software application, wherein the defined rating system establishes a rating of how effective the business software application is in meeting pre-determined requirements for each one of a set of business technology factors, wherein the set of business technology factors comprises:
a business function factor, wherein the business function factor is defined as a measure of how successful the business software application is in meeting user-defined needs for operations within an enterprise, a business fit factor, wherein the business fit factor is defined as a measure of how successful the business software application is in meeting stated goals of the enterprise, a business criticality factor, wherein the business criticality factor is defined as a measure of how critical the operations within the enterprise are to meeting the stated goals of the enterprise, and a software enterprise factor, wherein the software enterprise factor is defined as a measure of how compatible the business software application is with existing servers in the enterprise;

second program instructions executable by a processor to cause the processor to receive an input, into said computer tool, of rating values for the business software application, wherein the rating values describe how effective the business software application is in meeting the pre-determined requirements of each one of the set of business technology factors;

third program instructions executable by a processor to cause the processor to conduct an architectural fit analysis to evaluate an architectural fit of said business software application based on inputted said rating values, wherein the architectural fit analysis is performed by the processor utilizing inputted said rating values for the business software application and other software applications for comparing the business software application with the other software applications, wherein said comparing determines which software application provides a best architectural fit based on inputted rating values for the business software application and the other software applications;

fourth program instructions executable by a processor to cause the processor to generate an analysis report based on the architectural fit analysis, wherein the analysis report describes which software application provides the best architectural fit for meeting the pre-determined requirements for all of the set of business technology factors; and fifth program instructions executable by a processor to cause the processor to automatically install a software application that provides the best architectural fit for meeting the pre-determined requirements for all of the set of business technology factors.

10. The computer program product of claim 9, further comprising:

sixth program instructions executable by a processor to cause the processor to generate a graph of the analysis report, wherein the graph compares architectural fits for the business software application and the other software applications; and seventh program instructions executable by a processor to cause the processor to display the graph on a monitor.

11. The computer program product of claim 9, further comprising:

sixth program instructions executable by a processor to cause the processor to assign a defined key to the business software application, wherein the defined key identifies a vendor, a product name, and a release number of the business software application;

seventh program instructions executable by a processor to cause the processor to associate a randomly generated numeric key value to the defined key, wherein the randomly generated numeric key value is a numeral;

eighth program instructions executable by a processor to cause the processor to assign the randomly generated numeric key value to the business software application;

ninth program instructions executable by a processor to cause the processor to install the business software application on multiple servers, wherein the business software application is identified on all of the multiple servers by the randomly generated numeric key;

tenth program instructions executable by a processor to cause the processor to receive the inputted said rating values onto the multiple servers; and eleventh program instructions executable by a processor to cause the processor to associate the inputted said rating values from the multiple servers with the randomly generated numeric key, wherein the inputted said rating values are inputted into the computer tool in a consistent fashion.

12. The computer program product of claim 9, wherein architectural fit is defined as describing how adequately a software application integrates into a complete Information Technology (IT) environment and organization to meet the user-defined needs of the operations within the enterprise.

13. The computer program product of claim 9, further comprising:

sixth program instructions executable by a processor to cause the processor to set a minimum rating value for the business software application; and seventh program instructions executable by a processor to cause the processor to, in response to the business software application failing to meet the minimum rating value, adjust the operations within the enterprise until the business software application meets the minimum rating value.

14. The computer program product of claim 9, further comprising:

sixth program instructions executable by a processor to cause the processor to determine how many users within the enterprise are utilizing the business software application; and seventh program instructions executable by a processor to cause the processor to adjust technical support for the business software application according to how many users within the enterprise are determined to be utilizing the business software application.

15. The computer program product of claim 9, further comprising:

sixth program instructions executable by a processor to cause the processor to utilize the analysis report to determine which server within the enterprise is best suited to run the business software application; and seventh program instructions executable by a processor to cause the processor to install the business software application on a server that is best suited to run the business software application.

16. The computer program product of claim 9, further comprising:

sixth program instructions executable by a processor to cause the processor to identify a particular server, from multiple servers within the enterprise, that has more software application modules required to run the business software application as compared to other servers within the enterprise; and seventh program instructions executable by a processor to cause the processor to add the particular server to an Information Technology (IT) system of the enterprise.

* * * * *